(12) United States Patent
Steiner et al.

(10) Patent No.: US 8,850,100 B2
(45) Date of Patent: Sep. 30, 2014

(54) INTERLEAVING CODEWORD PORTIONS BETWEEN MULTIPLE PLANES AND/OR DIES OF A FLASH MEMORY DEVICE

(75) Inventors: Avi Steiner, Kiryat Motzkin (IL); Hanan Weingarten, Herzelia (IL); Guy Azrad, Bat Shlomo (IL); Avigdor Segal, Netanya (IL)

(73) Assignee: Densbits Technologies Ltd., Haifa (IL)

( * ) Notice: Subject to any disclaimer, the term of this patent is extended or adjusted under 35 U.S.C. 154(b) by 371 days.

(21) Appl. No.: 13/299,276

(22) Filed: Nov. 17, 2011

(65) Prior Publication Data

US 2012/0144093 A1 Jun. 7, 2012

Related U.S. Application Data

(60) Provisional application No. 61/420,654, filed on Dec. 7, 2010.

(51) Int. Cl.
| | |
|---|---|
| *G06F 12/04* | (2006.01) |
| *G06F 11/10* | (2006.01) |
| *G11C 7/02* | (2006.01) |
| *G11C 16/02* | (2006.01) |

(52) U.S. Cl.
USPC .......... 711/5; 711/103; 711/157; 365/185.33; 714/6.24

(58) Field of Classification Search
None
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Fandrich et al. |
| 5,623,620 A | 4/1997 | Fandrich et al. |

(Continued)

OTHER PUBLICATIONS

Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004, pp. 545-549.

(Continued)

*Primary Examiner* — Sanjiv Shah
*Assistant Examiner* — Glenn Gossage
(74) *Attorney, Agent, or Firm* — Dentons US LLP

(57) ABSTRACT

A system, a method and a non-transitory computer readable medium are disclosed. The non-transitory computer readable medium may store instructions for: (I) interleaving at least two portions of a first codeword of a group of codewords between at least two flash memory planes while violating at least one ordering rule out of (a) an even odd ordering rule, (b) a programming type ordering rule, and (c) a codeword portions ordering rule; and (II) interleaving different portions of other codewords of the group of codewords between multiple flash memory planes while maintaining the even odd ordering rule, the programming type ordering rule and the codeword portions ordering rule. The at least two portions may be programmed to rows in different flash memory blocks, and the flash memory planes may belong to the same or multiple flash memory dies. The programming type ordering may define different decoupling sequence steps with sizes set for different programming types according to sensitivity to noise.

42 Claims, 25 Drawing Sheets

(56) References Cited

U.S. PATENT DOCUMENTS

| | | |
|---|---|---|
| 5,640,529 A | 6/1997 | Hasbun |
| 5,657,332 A | 8/1997 | Auclair et al. |
| 5,663,901 A | 9/1997 | Wallace et al. |
| 5,724,538 A | 3/1998 | Morris et al. |
| 5,729,490 A | 3/1998 | Calligaro et al. |
| 5,740,395 A | 4/1998 | Wells et al. |
| 5,745,418 A | 4/1998 | Ma et al. |
| 5,778,430 A | 7/1998 | Ish et al. |
| 5,793,774 A | 8/1998 | Usui et al. |
| 5,920,578 A | 7/1999 | Zook |
| 5,926,409 A | 7/1999 | Engh et al. |
| 5,933,368 A | 8/1999 | Ma et al. |
| 5,956,268 A | 9/1999 | Lee |
| 5,956,473 A | 9/1999 | Ma et al. |
| 5,968,198 A | 10/1999 | Hassan et al. |
| 5,982,659 A | 11/1999 | Irrinki et al. |
| 6,011,741 A | 1/2000 | Wallace et al. |
| 6,016,275 A | 1/2000 | Han |
| 6,038,634 A | 3/2000 | Ji et al. |
| 6,081,878 A | 6/2000 | Estakhri et al. |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,667,628 B2 * | 2/2010 | Breiling ............... 341/81 |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 | 8/2012 | Haas et al. |
| 8,300,823 B2 | 10/2012 | Bojinov et al. |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 | 4/2013 | Khmelnitsky et al. |
| 2001/0034815 A1 | 10/2001 | Dugan et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2002/0156988 A1 | 10/2002 | Toyama et al. |
| 2002/0174156 A1 | 11/2002 | Birru et al. |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee et al. |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Norman et al. |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144361 A1 * | 6/2005 | Gonzalez et al. ............. 711/103 |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |

(56) References Cited

U.S. PATENT DOCUMENTS

| | | |
|---|---|---|
| 2006/0284244 A1 | 12/2006 | Forbes et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0034154 A1* | 2/2008 | Lee et al. ............... 711/103 |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0082917 A1* | 4/2010 | Yang et al. ............... 711/157 |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0195418 A1* | 8/2010 | Moon et al. ............... 365/189.16 |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153911 A1* | 6/2011 | Sprouse et al. ............... 711/103 |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |

(56) References Cited

U.S. PATENT DOCUMENTS

| | | |
|---|---|---|
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1 | 5/2012 | Goss et al. |
| 2012/0246391 A1 | 9/2012 | Meir et al. |

OTHER PUBLICATIONS

Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369 to II-372 vol. 2.

Michael Purser, "Introduction to Error Correcting Codes", Artech House Inc., 1995, pp. 1-133.

David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000, pp. 828-834.

J.M. Portal, H. Aziza, D Nee, "EEPROM Memory: Threshold Voltage Built in Self Diagnosis", ITC International Test Conference, Paper 2.1, copyright 2003, pp. 23-28.

J.M. Portal, H. Aziza, D. Nee, "EEPROM Diagnosis Based on Threshold Voltage Embedded Measurement", Journal of Electronic Testing: Theory and Applications 21, 2005, pp. 33-42.

G. Tao, A. Scarpa, J. Dijkstra, W. Stidl, F. Kuper, "Data retention prediction for modern floating gate non-volatile memories", Microelectronics Reliability 40 (2000), pp. 283-287.

T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.

Dempster, et al., "Maximum Likelihood from Incomplete Data via the EM Algorithm", Journal of the Royal Statistical Society. Series B (Methodological), vol. 39, No. 1 (1997), pp. 1-38.

Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.

Daneshbeh, "Bit Serial Systolic Architectures for Multiplicative Inversion and Division over GF (2)", A thesis presented to the University of Waterloo, Ontario, Canada, 2005, pp. 1-118.

Chen, Formulas for the solutions of Quadratic Equations over GF (2), IEEE Trans. Inform. Theory, vol. IT-28, No. 5, Sep. 1982, pp. 792-794.

Berlekamp et al., "On the Solution of Algebraic Equations over Finite Fields", Inform. Cont. 10, Oct. 1967, pp. 553-564.

\* cited by examiner

| | Die 0 | | | | | | | | Die 1 | | | | | | | |
| --- | --- | --- | --- | --- | --- | --- | --- | --- | --- | --- | --- | --- | --- | --- | --- | --- |
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 0 | 0 | 512 | 4 | 516 | 2 | 514 | 6 | 518 | 1 | 513 | 9 | 521 | 3 | 515 | 11 | 523 |
| 1 | 8 | 520 | 12 | 524 | 10 | 522 | 14 | 526 | 5 | 517 | 17 | 529 | 7 | 519 | 19 | 531 |
| 2 | 16 | 528 | 20 | 532 | 18 | 530 | 22 | 534 | 13 | 525 | 25 | 537 | 15 | 527 | 27 | 539 |
| 3 | 24 | 536 | 28 | 540 | 26 | 538 | 30 | 542 | 21 | 533 | 33 | 545 | 23 | 535 | 35 | 547 |
| 4 | 32 | 544 | 36 | 548 | 34 | 546 | 38 | 550 | 29 | 541 | 41 | 553 | 31 | 543 | 43 | 555 |
| 5 | 40 | 552 | 44 | 556 | 42 | 554 | 46 | 558 | 37 | 549 | 49 | 561 | 39 | 551 | 51 | 563 |
| 6 | 48 | 560 | 52 | 564 | 50 | 562 | 54 | 566 | 45 | 557 | 57 | 569 | 47 | 559 | 59 | 571 |
| 7 | 56 | 568 | 60 | 572 | 58 | 570 | 62 | 574 | 53 | 565 | 65 | 577 | 55 | 567 | 67 | 579 |
| 8 | 64 | 576 | 68 | 580 | 66 | 578 | 70 | 582 | 61 | 573 | 73 | 585 | 63 | 575 | 75 | 587 |
| 9 | 72 | 584 | 76 | 588 | 74 | 586 | 78 | 590 | 69 | 581 | 81 | 593 | 71 | 583 | 83 | 595 |
| 10 | 80 | 592 | 84 | 596 | 82 | 594 | 86 | 598 | 77 | 589 | 89 | 601 | 79 | 591 | 91 | 603 |
| 11 | 88 | 600 | 92 | 604 | 90 | 602 | 94 | 606 | 85 | 597 | 97 | 609 | 87 | 599 | 99 | 611 |
| 12 | 96 | 608 | 100 | 612 | 98 | 610 | 102 | 614 | 93 | 605 | 105 | 617 | 95 | 607 | 107 | 619 |
| 13 | 104 | 616 | 108 | 620 | 106 | 618 | 110 | 622 | 101 | 613 | 113 | 625 | 103 | 615 | 115 | 627 |
| 14 | 112 | 624 | 116 | 628 | 114 | 626 | 118 | 630 | 109 | 621 | 121 | 633 | 111 | 623 | 123 | 635 |
| 15 | 120 | 632 | 124 | 636 | 122 | 634 | 126 | 638 | 117 | 629 | 129 | 641 | 119 | 631 | 131 | 643 |
| 16 | 128 | 640 | 132 | 644 | 130 | 642 | 134 | 646 | 125 | 637 | 137 | 649 | 127 | 639 | 139 | 651 |
| 17 | 136 | 648 | 140 | 652 | 138 | 650 | 142 | 654 | 133 | 645 | 145 | 657 | 135 | 647 | 147 | 659 |
| 18 | 144 | 656 | 148 | 660 | 146 | 658 | 150 | 662 | 141 | 653 | 153 | 665 | 143 | 655 | 155 | 667 |
| 19 | 152 | 664 | 156 | 668 | 154 | 666 | 158 | 670 | 149 | 661 | 161 | 673 | 151 | 663 | 163 | 675 |
| 20 | 160 | 672 | 164 | 676 | 162 | 674 | 166 | 678 | 157 | 669 | 169 | 681 | 159 | 671 | 171 | 683 |
| 21 | 168 | 680 | 172 | 684 | 170 | 682 | 174 | 686 | 165 | 677 | 177 | 689 | 167 | 679 | 179 | 691 |
| 22 | 176 | 688 | 180 | 692 | 178 | 690 | 182 | 694 | 173 | 685 | 185 | 697 | 175 | 687 | 187 | 699 |
| 23 | 184 | 696 | 188 | 700 | 186 | 698 | 190 | 702 | 181 | 693 | 193 | 705 | 183 | 695 | 195 | 707 |
| 24 | 192 | 704 | 196 | 708 | 194 | 706 | 198 | 710 | 189 | 701 | 201 | 713 | 191 | 703 | 203 | 715 |
| 25 | 200 | 712 | 204 | 716 | 202 | 714 | 206 | 718 | 197 | 709 | 209 | 721 | 199 | 711 | 211 | 723 |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 26 | 208 | 720 | 212 | 724 | 210 | 722 | 214 | 726 | 205 | 717 | 217 | 729 | 207 | 719 | 219 | 731 |
| 27 | 216 | 728 | 220 | 732 | 218 | 730 | 222 | 734 | 213 | 725 | 225 | 737 | 215 | 727 | 227 | 739 |
| 28 | 224 | 736 | 228 | 740 | 226 | 738 | 230 | 742 | 221 | 733 | 233 | 745 | 223 | 735 | 235 | 747 |
| 29 | 232 | 744 | 236 | 748 | 234 | 746 | 238 | 750 | 229 | 741 | 241 | 753 | 231 | 743 | 243 | 755 |
| 30 | 240 | 752 | 244 | 756 | 242 | 754 | 246 | 758 | 237 | 749 | 249 | 761 | 239 | 751 | 251 | 763 |
| 31 | 248 | 760 | 252 | 764 | 250 | 762 | 254 | 766 | 245 | 757 | 257 | 769 | 247 | 759 | 259 | 771 |
| 32 | 256 | 768 | 260 | 772 | 258 | 770 | 262 | 774 | 253 | 765 | 265 | 777 | 255 | 767 | 267 | 779 |
| 33 | 264 | 776 | 268 | 780 | 266 | 778 | 270 | 782 | 261 | 773 | 273 | 785 | 263 | 775 | 275 | 787 |
| 34 | 272 | 784 | 276 | 788 | 274 | 786 | 278 | 790 | 269 | 781 | 281 | 793 | 271 | 783 | 283 | 795 |
| 35 | 280 | 792 | 284 | 796 | 282 | 794 | 286 | 798 | 277 | 789 | 289 | 801 | 279 | 791 | 291 | 803 |
| 36 | 288 | 800 | 292 | 804 | 290 | 802 | 294 | 806 | 285 | 797 | 297 | 809 | 287 | 799 | 299 | 811 |
| 37 | 296 | 808 | 300 | 812 | 298 | 810 | 302 | 814 | 293 | 805 | 305 | 817 | 295 | 807 | 307 | 819 |
| 38 | 304 | 816 | 308 | 820 | 306 | 818 | 310 | 822 | 301 | 813 | 313 | 825 | 303 | 815 | 315 | 827 |
| 39 | 312 | 824 | 316 | 828 | 314 | 826 | 318 | 830 | 309 | 821 | 321 | 833 | 311 | 823 | 323 | 835 |
| 40 | 320 | 832 | 324 | 836 | 322 | 834 | 326 | 838 | 317 | 829 | 329 | 841 | 319 | 831 | 331 | 843 |
| 41 | 328 | 840 | 332 | 844 | 330 | 842 | 334 | 846 | 325 | 837 | 337 | 849 | 327 | 839 | 339 | 851 |
| 42 | 336 | 848 | 340 | 852 | 338 | 850 | 342 | 854 | 333 | 845 | 345 | 857 | 335 | 847 | 347 | 859 |
| 43 | 344 | 856 | 348 | 860 | 346 | 858 | 350 | 862 | 341 | 853 | 353 | 865 | 343 | 855 | 355 | 867 |
| 44 | 352 | 864 | 356 | 868 | 354 | 866 | 358 | 870 | 349 | 861 | 361 | 873 | 351 | 863 | 363 | 875 |
| 45 | 360 | 872 | 364 | 876 | 362 | 874 | 366 | 878 | 357 | 869 | 369 | 881 | 359 | 871 | 371 | 883 |
| 46 | 368 | 880 | 372 | 884 | 370 | 882 | 374 | 886 | 365 | 877 | 377 | 889 | 367 | 879 | 379 | 891 |
| 47 | 376 | 888 | 380 | 892 | 378 | 890 | 382 | 894 | 373 | 885 | 385 | 897 | 375 | 887 | 387 | 899 |
| 48 | 384 | 896 | 388 | 900 | 386 | 898 | 390 | 902 | 381 | 893 | 393 | 905 | 383 | 895 | 395 | 907 |
| 49 | 392 | 904 | 396 | 908 | 394 | 906 | 398 | 910 | 389 | 901 | 401 | 913 | 391 | 903 | 403 | 915 |
| 50 | 400 | 912 | 404 | 916 | 402 | 914 | 406 | 918 | 397 | 909 | 409 | 921 | 399 | 911 | 411 | 923 |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 51 | 408 | 920 | 412 | 924 | 410 | 922 | 414 | 926 | 405 | 917 | 417 | 929 | 407 | 919 | 419 | 931 |
| 53 | 424 | 936 | 428 | 940 | 426 | 938 | 430 | 942 | 421 | 933 | 433 | 945 | 423 | 935 | 435 | 947 |
| 54 | 432 | 944 | 436 | 948 | 434 | 946 | 438 | 950 | 429 | 941 | 441 | 953 | 431 | 943 | 443 | 955 |
| 55 | 440 | 952 | 444 | 956 | 442 | 954 | 446 | 958 | 437 | 949 | 449 | 961 | 439 | 951 | 451 | 963 |
| 56 | 448 | 960 | 452 | 964 | 450 | 962 | 454 | 966 | 445 | 957 | 457 | 969 | 447 | 959 | 459 | 971 |
| 57 | 456 | 968 | 460 | 972 | 458 | 970 | 462 | 974 | 453 | 965 | 465 | 977 | 455 | 967 | 467 | 979 |
| 58 | 464 | 976 | 468 | 980 | 466 | 978 | 470 | 982 | 461 | 973 | 473 | 985 | 463 | 975 | 475 | 987 |
| 59 | 472 | 984 | 476 | 988 | 474 | 986 | 478 | 990 | 469 | 981 | 481 | 993 | 471 | 983 | 483 | 995 |
| 60 | 480 | 992 | 484 | 996 | 482 | 994 | 486 | 998 | 477 | 989 | 489 | 1001 | 479 | 991 | 491 | 1003 |
| 61 | 488 | 1000 | 492 | 1004 | 490 | 1002 | 494 | 1006 | 485 | 997 | 497 | 1009 | 487 | 999 | 499 | 1011 |
| 62 | 496 | 1008 | 500 | 1012 | 498 | 1010 | 502 | 1014 | 493 | 1005 | 505 | 1017 | 495 | 1007 | 507 | 1019 |
| 63 | 504 | 1016 | 508 | 1020 | 506 | 1018 | 510 | 1022 | 501 | 1013 | 509 | 1021 | 503 | 1015 | 511 | 1023 |
| | Plane 0 | | | | Plane 1 | | | | Plane 0 | | | | Plane 1 | | | |
| | Die 0 | | | | | | | | Die 1 | | | | | | | |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 0 | 0 | 20 | 4 | 24 | 2 | 22 | 6 | 26 | 1 | 21 | 9 | 29 | 3 | 23 | 11 | 31 |
| 1 | 8 | 28 | 12 | 40 | 10 | 30 | 14 | 42 | 5 | 25 | 17 | 45 | 7 | 27 | 19 | 47 |
| 2 | 16 | 44 | 32 | 56 | 18 | 46 | 34 | 58 | 13 | 41 | 37 | 61 | 15 | 43 | 39 | 63 |
| 3 | 36 | 60 | 48 | 72 | 38 | 62 | 50 | 74 | 33 | 57 | 53 | 77 | 35 | 59 | 55 | 79 |
| 4 | 52 | 76 | 64 | 88 | 54 | 78 | 66 | 90 | 49 | 73 | 69 | 93 | 51 | 75 | 71 | 95 |
| 5 | 68 | 92 | 80 | 104 | 70 | 94 | 82 | 106 | 65 | 89 | 85 | 109 | 67 | 91 | 87 | 111 |
| 6 | 84 | 108 | 96 | 120 | 86 | 110 | 98 | 122 | 81 | 105 | 101 | 125 | 83 | 107 | 103 | 127 |
| 7 | 100 | 124 | 112 | 136 | 102 | 126 | 114 | 138 | 97 | 121 | 117 | 141 | 99 | 123 | 119 | 143 |
| 8 | 116 | 140 | 128 | 152 | 118 | 142 | 130 | 154 | 113 | 137 | 133 | 157 | 115 | 139 | 135 | 159 |
| 9 | 132 | 156 | 144 | 168 | 134 | 158 | 146 | 170 | 129 | 153 | 149 | 173 | 131 | 155 | 151 | 175 |
| 10 | 148 | 172 | 160 | 184 | 150 | 174 | 162 | 186 | 145 | 169 | 165 | 189 | 147 | 171 | 167 | 191 |
| 11 | 164 | 188 | 176 | 200 | 166 | 190 | 178 | 202 | 161 | 185 | 181 | 205 | 163 | 187 | 183 | 207 |
| 12 | 180 | 204 | 192 | 216 | 182 | 206 | 194 | 218 | 177 | 201 | 197 | 221 | 179 | 203 | 199 | 223 |
| 13 | 196 | 220 | 208 | 232 | 198 | 222 | 210 | 234 | 193 | 217 | 213 | 237 | 195 | 219 | 215 | 239 |
| 14 | 212 | 236 | 224 | 248 | 214 | 238 | 226 | 250 | 209 | 233 | 229 | 253 | 211 | 235 | 231 | 255 |
| 15 | 228 | 252 | 240 | 264 | 230 | 254 | 242 | 266 | 225 | 249 | 245 | 269 | 227 | 251 | 247 | 271 |
| 16 | 244 | 268 | 256 | 280 | 246 | 270 | 258 | 282 | 241 | 265 | 261 | 285 | 243 | 267 | 263 | 287 |
| 17 | 260 | 284 | 272 | 296 | 262 | 286 | 274 | 298 | 257 | 281 | 277 | 301 | 259 | 283 | 279 | 303 |
| 18 | 276 | 300 | 288 | 312 | 278 | 302 | 290 | 314 | 273 | 297 | 293 | 317 | 275 | 299 | 295 | 319 |
| 19 | 292 | 316 | 304 | 328 | 294 | 318 | 306 | 330 | 289 | 313 | 309 | 333 | 291 | 315 | 311 | 335 |
| 20 | 308 | 332 | 320 | 344 | 310 | 334 | 322 | 346 | 305 | 329 | 325 | 349 | 307 | 331 | 327 | 351 |
| 21 | 324 | 348 | 336 | 360 | 326 | 350 | 338 | 362 | 321 | 345 | 341 | 365 | 323 | 347 | 343 | 367 |
| 22 | 340 | 364 | 352 | 376 | 342 | 366 | 354 | 378 | 337 | 361 | 357 | 381 | 339 | 363 | 359 | 383 |
| 23 | 356 | 380 | 368 | 392 | 358 | 382 | 370 | 394 | 353 | 377 | 373 | 397 | 355 | 379 | 375 | 399 |
| 24 | 372 | 396 | 384 | 408 | 374 | 398 | 386 | 410 | 369 | 393 | 389 | 413 | 371 | 395 | 391 | 415 |
| 25 | 388 | 412 | 400 | 424 | 390 | 414 | 402 | 426 | 385 | 409 | 405 | 429 | 387 | 411 | 407 | 431 |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 26 | 404 | 428 | 416 | 440 | 406 | 430 | 418 | 442 | 401 | 425 | 421 | 445 | 403 | 427 | 423 | 447 |
| 27 | 420 | 444 | 432 | 456 | 422 | 446 | 434 | 458 | 417 | 441 | 437 | 461 | 419 | 443 | 439 | 463 |
| 28 | 436 | 460 | 448 | 472 | 438 | 462 | 450 | 474 | 433 | 457 | 453 | 477 | 435 | 459 | 455 | 479 |
| 29 | 452 | 476 | 464 | 488 | 454 | 478 | 466 | 490 | 449 | 473 | 469 | 493 | 451 | 475 | 471 | 495 |
| 30 | 468 | 492 | 480 | 504 | 470 | 494 | 482 | 506 | 465 | 489 | 485 | 509 | 467 | 491 | 487 | 511 |
| 31 | 484 | 508 | 496 | 520 | 486 | 510 | 498 | 522 | 481 | 505 | 501 | 525 | 483 | 507 | 503 | 527 |
| 32 | 500 | 524 | 512 | 536 | 502 | 526 | 514 | 538 | 497 | 521 | 517 | 541 | 499 | 523 | 519 | 543 |
| 33 | 516 | 540 | 528 | 552 | 518 | 542 | 530 | 554 | 513 | 537 | 533 | 557 | 515 | 539 | 535 | 559 |
| 34 | 532 | 556 | 544 | 568 | 534 | 558 | 546 | 570 | 529 | 553 | 549 | 573 | 531 | 555 | 551 | 575 |
| 35 | 548 | 572 | 560 | 584 | 550 | 574 | 562 | 586 | 545 | 569 | 565 | 589 | 547 | 571 | 567 | 591 |
| 36 | 564 | 588 | 576 | 600 | 566 | 590 | 578 | 602 | 561 | 585 | 581 | 605 | 563 | 587 | 583 | 607 |
| 37 | 580 | 604 | 592 | 616 | 582 | 606 | 594 | 618 | 577 | 601 | 597 | 621 | 579 | 603 | 599 | 623 |
| 38 | 596 | 620 | 608 | 632 | 598 | 622 | 610 | 634 | 593 | 617 | 613 | 637 | 595 | 619 | 615 | 639 |
| 39 | 612 | 636 | 624 | 648 | 614 | 638 | 626 | 650 | 609 | 633 | 629 | 653 | 611 | 635 | 631 | 655 |
| 40 | 628 | 652 | 640 | 664 | 630 | 654 | 642 | 666 | 625 | 649 | 645 | 669 | 627 | 651 | 647 | 671 |
| 41 | 644 | 668 | 656 | 680 | 646 | 670 | 658 | 682 | 641 | 665 | 661 | 685 | 643 | 667 | 663 | 687 |
| 42 | 660 | 684 | 672 | 696 | 662 | 686 | 674 | 698 | 657 | 681 | 677 | 701 | 659 | 683 | 679 | 703 |
| 43 | 676 | 700 | 688 | 712 | 678 | 702 | 690 | 714 | 673 | 697 | 693 | 717 | 675 | 699 | 695 | 719 |
| 44 | 692 | 716 | 704 | 728 | 694 | 718 | 706 | 730 | 689 | 713 | 709 | 733 | 691 | 715 | 711 | 735 |
| 45 | 708 | 732 | 720 | 744 | 710 | 734 | 722 | 746 | 705 | 729 | 725 | 749 | 707 | 731 | 727 | 751 |
| 46 | 724 | 748 | 736 | 760 | 726 | 750 | 738 | 762 | 721 | 745 | 741 | 765 | 723 | 747 | 743 | 767 |
| 47 | 740 | 764 | 752 | 776 | 742 | 766 | 754 | 778 | 737 | 761 | 757 | 781 | 739 | 763 | 759 | 783 |
| 48 | 756 | 780 | 768 | 792 | 758 | 782 | 770 | 794 | 753 | 777 | 773 | 797 | 755 | 779 | 775 | 799 |
| 49 | 772 | 796 | 784 | 808 | 774 | 798 | 786 | 810 | 769 | 793 | 789 | 813 | 771 | 795 | 791 | 815 |
| 50 | 788 | 812 | 800 | 824 | 790 | 814 | 802 | 826 | 785 | 809 | 805 | 829 | 787 | 811 | 807 | 831 |

|  | Die 0 | | | | | | | | Die 1 | | | | | | | |
|---|---|---|---|---|---|---|---|---|---|---|---|---|---|---|---|---|
|  | Plane 0 | | | | Plane 1 | | | | Plane 0 | | | | Plane 1 | | | |
|  | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 51 | 804 | 828 | 816 | 840 | 806 | 830 | 818 | 842 | 801 | 825 | 821 | 845 | 803 | 827 | 823 | 847 |
| 52 | 820 | 844 | 832 | 856 | 822 | 846 | 834 | 858 | 817 | 841 | 837 | 861 | 819 | 843 | 839 | 863 |
| 53 | 836 | 860 | 848 | 872 | 838 | 862 | 850 | 874 | 833 | 857 | 853 | 877 | 835 | 859 | 855 | 879 |
| 54 | 852 | 876 | 864 | 888 | 854 | 878 | 866 | 890 | 849 | 873 | 869 | 893 | 851 | 875 | 871 | 895 |
| 55 | 868 | 892 | 880 | 904 | 870 | 894 | 882 | 906 | 865 | 889 | 885 | 909 | 867 | 891 | 887 | 911 |
| 56 | 884 | 908 | 896 | 920 | 886 | 910 | 898 | 922 | 881 | 905 | 901 | 925 | 883 | 907 | 903 | 927 |
| 57 | 900 | 924 | 912 | 936 | 902 | 926 | 914 | 938 | 897 | 921 | 917 | 941 | 899 | 923 | 919 | 943 |
| 58 | 916 | 940 | 928 | 952 | 918 | 942 | 930 | 954 | 913 | 937 | 933 | 957 | 915 | 939 | 935 | 959 |
| 59 | 932 | 956 | 944 | 968 | 934 | 958 | 946 | 970 | 929 | 953 | 949 | 973 | 931 | 955 | 951 | 975 |
| 60 | 948 | 972 | 960 | 984 | 950 | 974 | 962 | 986 | 945 | 969 | 965 | 989 | 947 | 971 | 967 | 991 |
| 61 | 964 | 988 | 976 | 1000 | 966 | 990 | 978 | 1002 | 961 | 985 | 981 | 1005 | 963 | 987 | 983 | 1007 |
| 62 | 980 | 1004 | 992 | 1012 | 982 | 1006 | 994 | 1014 | 977 | 1001 | 997 | 1017 | 979 | 1003 | 999 | 1019 |
| 63 | 996 | 1016 | 1008 | 1020 | 998 | 1018 | 1010 | 1022 | 993 | 1013 | 1009 | 1021 | 995 | 1015 | 1011 | 1023 |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 0 | 0 | 20 | 4 | 24 | 2 | 22 | 6 | 26 | 1 | 21 | 9 | 29 | 3 | 23 | 11 | 31 |
| 1 | 8 | 28 | 12 | 40 | 10 | 30 | 14 | 42 | 5 | 25 | 17 | 45 | 7 | 27 | 19 | 47 |
| 2 | 16 | 44 | 32 | 56 | 18 | 46 | 34 | 58 | 13 | 41 | 37 | 61 | 15 | 43 | 39 | 63 |
| 3 | 36 | 60 | 48 | 72 | 38 | 62 | 50 | 74 | 33 | 57 | 53 | 77 | 35 | 59 | 55 | 79 |
| 4 | 52 | 76 | 64 | 88 | 54 | 78 | 66 | 90 | 49 | 73 | 69 | 93 | 51 | 75 | 71 | 95 |
| 5 | 68 | 92 | 80 | 104 | 70 | 94 | 82 | 106 | 65 | 89 | 85 | 109 | 67 | 91 | 87 | 111 |
| 6 | 84 | 108 | 96 | 120 | 86 | 110 | 98 | 122 | 81 | 105 | 101 | 125 | 83 | 107 | 103 | 127 |
| 7 | 100 | 124 | 112 | 136 | 102 | 126 | 114 | 138 | 97 | 121 | 117 | 141 | 99 | 123 | 119 | 143 |
| 8 | 116 | 140 | 128 | 152 | 118 | 142 | 130 | 154 | 113 | 137 | 133 | 157 | 115 | 139 | 135 | 159 |
| 9 | 132 | 156 | 144 | 168 | 134 | 158 | 146 | 170 | 129 | 153 | 149 | 173 | 131 | 155 | 151 | 175 |
| 10 | 148 | 172 | 160 | 184 | 150 | 174 | 162 | 186 | 145 | 169 | 165 | 189 | 147 | 171 | 167 | 191 |
| 11 | 164 | 188 | 176 | 200 | 166 | 190 | 178 | 202 | 161 | 185 | 181 | 205 | 163 | 187 | 183 | 207 |
| 12 | 180 | 204 | 192 | 216 | 182 | 206 | 194 | 218 | 177 | 201 | 197 | 221 | 179 | 203 | 199 | 223 |
| 13 | 196 | 220 | 208 | 232 | 198 | 222 | 210 | 234 | 193 | 217 | 213 | 237 | 195 | 219 | 215 | 239 |
| 14 | 212 | 236 | 224 | 248 | 214 | 238 | 226 | 250 | 209 | 233 | 229 | 253 | 211 | 235 | 231 | 255 |
| 15 | 228 | 252 | 240 | 264 | 230 | 254 | 242 | 266 | 225 | 249 | 245 | 269 | 227 | 251 | 247 | 271 |
| 16 | 244 | 268 | 256 | 280 | 246 | 270 | 258 | 282 | 241 | 265 | 261 | 285 | 243 | 267 | 263 | 287 |
| 17 | 260 | 284 | 272 | 296 | 262 | 286 | 274 | 298 | 257 | 281 | 277 | 301 | 259 | 283 | 279 | 303 |
| 18 | 276 | 300 | 288 | 312 | 278 | 302 | 290 | 314 | 273 | 297 | 293 | 317 | 275 | 299 | 295 | 319 |
| 19 | 292 | 316 | 304 | 328 | 294 | 318 | 306 | 330 | 289 | 313 | 309 | 333 | 291 | 315 | 311 | 335 |
| 20 | 308 | 332 | 320 | 344 | 310 | 334 | 322 | 346 | 305 | 329 | 325 | 349 | 307 | 331 | 327 | 351 |
| 21 | 324 | 348 | 336 | 360 | 326 | 350 | 338 | 362 | 321 | 345 | 341 | 365 | 323 | 347 | 343 | 367 |
| 22 | 340 | 364 | 352 | 376 | 342 | 366 | 354 | 378 | 337 | 361 | 357 | 381 | 339 | 363 | 359 | 383 |
| 23 | 356 | 380 | 368 | 392 | 358 | 382 | 370 | 394 | 353 | 377 | 373 | 397 | 355 | 379 | 375 | 399 |
| 24 | 372 | 396 | 384 | 408 | 374 | 398 | 386 | 410 | 369 | 393 | 389 | 413 | 371 | 395 | 391 | 415 |
| 25 | 388 | 412 | 400 | 424 | 390 | 414 | 402 | 426 | 385 | 409 | 405 | 429 | 387 | 411 | 407 | 431 |

| Row | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| | MSB | LSB | MSB | LSB | MSB | LSB | MSB | LSB | MSB | LSB | MSB | LSB | MSB | LSB | MSB | LSB |
| 26 | 404 | 428 | 416 | 440 | 406 | 430 | 418 | 442 | 401 | 425 | 421 | 445 | 403 | 427 | 423 | 447 |
| 27 | 420 | 444 | 432 | 456 | 422 | 446 | 434 | 458 | 417 | 441 | 437 | 461 | 419 | 443 | 439 | 463 |
| 28 | 436 | 460 | 448 | 472 | 438 | 462 | 450 | 474 | 433 | 457 | 453 | 477 | 435 | 459 | 455 | 479 |
| 29 | 452 | 476 | 464 | 488 | 454 | 478 | 466 | 490 | 449 | 473 | 469 | 493 | 451 | 475 | 471 | 495 |
| 30 | 468 | 492 | 480 | 504 | 470 | 494 | 482 | 506 | 465 | 489 | 485 | 509 | 467 | 491 | 487 | 511 |
| 31 | 484 | 508 | 496 | 520 | 486 | 510 | 498 | 522 | 481 | 505 | 501 | 525 | 483 | 507 | 503 | 527 |
| 32 | 500 | 524 | 512 | 536 | 502 | 526 | 514 | 538 | 497 | 521 | 517 | 541 | 499 | 523 | 519 | 543 |
| 33 | 516 | 540 | 528 | 552 | 518 | 542 | 530 | 554 | 513 | 537 | 533 | 557 | 515 | 539 | 535 | 559 |
| 34 | 532 | 556 | 544 | 568 | 534 | 558 | 546 | 570 | 529 | 553 | 549 | 573 | 531 | 555 | 551 | 575 |
| 35 | 548 | 572 | 560 | 584 | 550 | 574 | 562 | 586 | 545 | 569 | 565 | 589 | 547 | 571 | 567 | 591 |
| 36 | 564 | 588 | 576 | 600 | 566 | 590 | 578 | 602 | 561 | 585 | 581 | 605 | 563 | 587 | 583 | 607 |
| 37 | 580 | 604 | 592 | 616 | 582 | 606 | 594 | 618 | 577 | 601 | 597 | 621 | 579 | 603 | 599 | 623 |
| 38 | 596 | 620 | 608 | 632 | 598 | 622 | 610 | 634 | 593 | 617 | 613 | 637 | 595 | 619 | 615 | 639 |
| 39 | 612 | 636 | 624 | 648 | 614 | 638 | 626 | 650 | 609 | 633 | 629 | 653 | 611 | 635 | 631 | 655 |
| 40 | 628 | 652 | 640 | 664 | 630 | 654 | 642 | 666 | 625 | 649 | 645 | 669 | 627 | 651 | 647 | 671 |
| 41 | 644 | 668 | 656 | 680 | 646 | 670 | 658 | 682 | 641 | 665 | 661 | 685 | 643 | 667 | 663 | 687 |
| 42 | 660 | 684 | 672 | 696 | 662 | 686 | 674 | 698 | 657 | 681 | 677 | 701 | 659 | 683 | 679 | 703 |
| 43 | 676 | 700 | 688 | 712 | 678 | 702 | 690 | 714 | 673 | 697 | 693 | 717 | 675 | 699 | 695 | 719 |
| 44 | 692 | 716 | 704 | 728 | 694 | 718 | 706 | 730 | 689 | 713 | 709 | 733 | 691 | 715 | 711 | 735 |
| 45 | 708 | 732 | 720 | 744 | 710 | 734 | 722 | 746 | 705 | 729 | 725 | 749 | 707 | 731 | 727 | 751 |

| | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 51 | 804 | 828 | 816 | 840 | 806 | 830 | 818 | 842 | 801 | 825 | 821 | 845 | 803 | 827 | 823 | 847 |
| 52 | 820 | 844 | 832 | 856 | 822 | 846 | 834 | 858 | 817 | 841 | 837 | 861 | 819 | 843 | 839 | 863 |
| 53 | 836 | 860 | 848 | 872 | 838 | 862 | 850 | 874 | 833 | 857 | 853 | 877 | 835 | 859 | 855 | 879 |
| 54 | 852 | 876 | 864 | 888 | 854 | 878 | 866 | 890 | 849 | 873 | 869 | 893 | 851 | 875 | 871 | 895 |
| 55 | 868 | 892 | 880 | 904 | 870 | 894 | 882 | 906 | 865 | 889 | 885 | 909 | 867 | 891 | 887 | 911 |
| 56 | 884 | 908 | 896 | 920 | 886 | 910 | 898 | 922 | 881 | 905 | 901 | 925 | 883 | 907 | 903 | 927 |
| 57 | 900 | 924 | 912 | 936 | 902 | 926 | 914 | 938 | 897 | 921 | 917 | 941 | 899 | 923 | 919 | 943 |
| 58 | 916 | 940 | 928 | 952 | 918 | 942 | 930 | 954 | 913 | 937 | 933 | 957 | 915 | 939 | 935 | 959 |
| 59 | 932 | 956 | 944 | 968 | 934 | 958 | 946 | 970 | 929 | 953 | 949 | 973 | 931 | 955 | 951 | 975 |
| 60 | 948 | 972 | 960 | 984 | 950 | 974 | 962 | 986 | 945 | 969 | 965 | 989 | 947 | 971 | 967 | 991 |
| 61 | 964 | 988 | 976 | 1000 | 966 | 990 | 978 | 1002 | 961 | 985 | 981 | 1005 | 963 | 987 | 983 | 1007 |
| 62 | 980 | 1004 | 992 | 1012 | 982 | 1006 | 994 | 1014 | 977 | 1001 | 997 | 1017 | 979 | 1003 | 999 | 1019 |
| 63 | 996 | 1016 | 1008 | 1020 | 998 | 1018 | 1010 | 1022 | 993 | 1013 | 1009 | 1021 | 995 | 1015 | 1011 | 1023 |

|  | Plane 0 | | | | Plane 1 | | | |
|---|---|---|---|---|---|---|---|---|
|  | Even Pages | | Odd Pages | | Even Pages | | Odd Pages | |
| Row | MSB | LSB | MSB | LSB | MSB | LSB | MSB | LSB |
| 0 | 0 | 10 | 2 | 12 | 1 | 11 | 5 | 15 |
| 1 | 4 | 14 | 6 | 20 | 3 | 13 | 9 | 23 |
| 2 | 8 | 22 | 16 | 28 | 7 | 21 | 19 | 31 |
| 3 | 18 | 30 | 24 | 36 | 17 | 29 | 27 | 39 |
| 4 | 26 | 38 | 32 | 44 | 25 | 37 | 35 | 47 |
| 5 | 34 | 46 | 40 | 52 | 33 | 45 | 43 | 55 |
| 6 | 42 | 54 | 48 | 60 | 41 | 53 | 51 | 63 |
| 7 | 50 | 62 | 56 | 68 | 49 | 61 | 59 | 71 |
| 8 | 58 | 70 | 64 | 76 | 57 | 69 | 67 | 79 |
| 9 | 66 | 78 | 72 | 84 | 65 | 77 | 75 | 87 |
| 10 | 74 | 86 | 80 | 92 | 73 | 85 | 83 | 95 |
| 11 | 82 | 94 | 88 | 100 | 81 | 93 | 91 | 103 |
| 12 | 90 | 102 | 96 | 108 | 89 | 101 | 99 | 111 |
| 13 | 98 | 110 | 104 | 116 | 97 | 109 | 107 | 119 |
| 14 | 106 | 118 | 112 | 124 | 105 | 117 | 115 | 127 |
| 15 | 114 | 126 | 120 | 132 | 113 | 125 | 123 | 135 |
| 16 | 122 | 134 | 128 | 140 | 121 | 133 | 131 | 143 |
| 17 | 130 | 142 | 136 | 148 | 129 | 141 | 139 | 151 |
| 18 | 138 | 150 | 144 | 156 | 137 | 149 | 147 | 159 |
| 19 | 146 | 158 | 152 | 164 | 145 | 157 | 155 | 167 |
| 20 | 154 | 166 | 160 | 172 | 153 | 165 | 163 | 175 |
| 21 | 162 | 174 | 168 | 180 | 161 | 173 | 171 | 183 |
| 22 | 170 | 182 | 176 | 188 | 169 | 181 | 179 | 191 |
| 23 | 178 | 190 | 184 | 196 | 177 | 189 | 187 | 199 |
| 24 | 186 | 198 | 192 | 204 | 185 | 197 | 195 | 207 |
| 25 | 194 | 206 | 200 | 212 | 193 | 205 | 203 | 215 |
| 26 | 202 | 214 | 208 | 220 | 201 | 213 | 211 | 223 |
| 27 | 210 | 222 | 216 | 228 | 209 | 221 | 219 | 231 |
| 28 | 218 | 230 | 224 | 236 | 217 | 229 | 227 | 239 |
| 29 | 226 | 238 | 232 | 244 | 225 | 237 | 235 | 247 |
| 30 | 234 | 246 | 240 | 252 | 233 | 245 | 243 | 255 |
| 31 | 242 | 254 | 248 | 260 | 241 | 253 | 251 | 263 |
| 32 | 250 | 262 | 256 | 268 | 249 | 261 | 259 | 271 |
| 33 | 258 | 270 | 264 | 276 | 257 | 269 | 267 | 279 |
| 34 | 266 | 278 | 272 | 284 | 265 | 277 | 275 | 287 |
| 35 | 274 | 286 | 280 | 292 | 273 | 285 | 283 | 295 |

FIG. 5A

|     | Plane 0 | | | | Plane 1 | | | |
|     | Even Pages | | Odd Pages | | Even Pages | | Odd Pages | |
| Row | MSB | LSB | MSB | LSB | MSB | LSB | MSB | LSB |
| --- | --- | --- | --- | --- | --- | --- | --- | --- |
| 36 | 282 | 294 | 288 | 300 | 281 | 293 | 291 | 303 |
| 37 | 290 | 302 | 296 | 308 | 289 | 301 | 299 | 311 |
| 38 | 298 | 310 | 304 | 316 | 297 | 309 | 307 | 319 |
| 39 | 306 | 318 | 312 | 324 | 305 | 317 | 315 | 327 |
| 40 | 314 | 326 | 320 | 332 | 313 | 325 | 323 | 335 |
| 41 | 322 | 334 | 328 | 340 | 321 | 333 | 331 | 343 |
| 42 | 330 | 342 | 336 | 348 | 329 | 341 | 339 | 351 |
| 43 | 338 | 350 | 344 | 356 | 337 | 349 | 347 | 359 |
| 44 | 346 | 358 | 352 | 364 | 345 | 357 | 355 | 367 |
| 45 | 354 | 366 | 360 | 372 | 353 | 365 | 363 | 375 |
| 46 | 362 | 374 | 368 | 380 | 361 | 373 | 371 | 383 |
| 47 | 370 | 382 | 376 | 388 | 369 | 381 | 379 | 391 |
| 48 | 378 | 390 | 384 | 396 | 377 | 389 | 387 | 399 |
| 49 | 386 | 398 | 392 | 404 | 385 | 397 | 395 | 407 |
| 50 | 394 | 406 | 400 | 412 | 393 | 405 | 403 | 415 |
| 51 | 402 | 414 | 408 | 420 | 401 | 413 | 411 | 423 |
| 52 | 410 | 422 | 416 | 428 | 409 | 421 | 419 | 431 |
| 53 | 418 | 430 | 424 | 436 | 417 | 429 | 427 | 439 |
| 54 | 426 | 438 | 432 | 444 | 425 | 437 | 435 | 447 |
| 55 | 434 | 446 | 440 | 452 | 433 | 445 | 443 | 455 |
| 56 | 442 | 454 | 448 | 460 | 441 | 453 | 451 | 463 |
| 57 | 450 | 462 | 456 | 468 | 449 | 461 | 459 | 471 |
| 58 | 458 | 470 | 464 | 476 | 457 | 469 | 467 | 479 |
| 59 | 466 | 478 | 472 | 484 | 465 | 477 | 475 | 487 |
| 60 | 474 | 486 | 480 | 492 | 473 | 485 | 483 | 495 |
| 61 | 482 | 494 | 488 | 500 | 481 | 493 | 491 | 503 |
| 62 | 490 | 502 | 496 | 506 | 489 | 501 | 499 | 509 |
| 63 | 498 | 508 | 504 | 510 | 497 | 507 | 505 | 511 |

| Row | Die 0 ||||||||
|---|---|---|---|---|---|---|---|---|
| | Plane 0 |||| Plane 1 ||||
| | Even Pages || Odd Pages || Even Pages || Odd Pages ||
| | MSB | LSB | MSB | LSB | MSB | LSB | MSB | LSB |
| 0 | 0 | 22 | 2 | 24 | 1 | 23 | 5 | 27 |
| 1 | 4 | 26 | 6 | 32 | 3 | 25 | 9 | 35 |
| 2 | 8 | 34 | 10 | 40 | 7 | 33 | 13 | 43 |
| 3 | 12 | 42 | 14 | 48 | 11 | 41 | 17 | 51 |
| 4 | 16 | 50 | 18 | 56 | 15 | 49 | 21 | 59 |
| 5 | 20 | 58 | 28 | 64 | 19 | 57 | 31 | 67 |
| 6 | 30 | 66 | 36 | 72 | 29 | 65 | 39 | 75 |
| 7 | 38 | 74 | 44 | 80 | 37 | 73 | 47 | 83 |
| 8 | 46 | 82 | 52 | 88 | 45 | 81 | 55 | 91 |
| 9 | 54 | 90 | 60 | 96 | 53 | 89 | 63 | 99 |
| 10 | 62 | 98 | 68 | 104 | 61 | 97 | 71 | 107 |
| 11 | 70 | 106 | 76 | 112 | 69 | 105 | 79 | 115 |
| 12 | 78 | 114 | 84 | 120 | 77 | 113 | 87 | 123 |
| 13 | 86 | 122 | 92 | 128 | 85 | 121 | 95 | 131 |
| 14 | 94 | 130 | 100 | 136 | 93 | 129 | 103 | 139 |
| 15 | 102 | 138 | 108 | 144 | 101 | 137 | 111 | 147 |
| 16 | 110 | 146 | 116 | 152 | 109 | 145 | 119 | 155 |
| 17 | 118 | 154 | 124 | 160 | 117 | 153 | 127 | 163 |
| 18 | 126 | 162 | 132 | 168 | 125 | 161 | 135 | 171 |
| 19 | 134 | 170 | 140 | 176 | 133 | 169 | 143 | 179 |
| 20 | 142 | 178 | 148 | 184 | 141 | 177 | 151 | 187 |
| 21 | 150 | 186 | 156 | 192 | 149 | 185 | 159 | 195 |
| 22 | 158 | 194 | 164 | 200 | 157 | 193 | 167 | 203 |
| 23 | 166 | 202 | 172 | 208 | 165 | 201 | 175 | 211 |
| 24 | 174 | 210 | 180 | 216 | 173 | 209 | 183 | 219 |
| 25 | 182 | 218 | 188 | 224 | 181 | 217 | 191 | 227 |
| 26 | 190 | 226 | 196 | 232 | 189 | 225 | 199 | 235 |
| 27 | 198 | 234 | 204 | 240 | 197 | 233 | 207 | 243 |
| 28 | 206 | 242 | 212 | 248 | 205 | 241 | 215 | 251 |
| 29 | 214 | 250 | 220 | 256 | 213 | 249 | 223 | 259 |
| 30 | 222 | 258 | 228 | 264 | 221 | 257 | 231 | 267 |
| 31 | 230 | 266 | 236 | 272 | 229 | 265 | 239 | 275 |
| 32 | 238 | 274 | 244 | 280 | 237 | 273 | 247 | 283 |
| 33 | 246 | 282 | 252 | 288 | 245 | 281 | 255 | 291 |
| 34 | 254 | 290 | 260 | 296 | 253 | 289 | 263 | 299 |
| 35 | 262 | 298 | 268 | 304 | 261 | 297 | 271 | 307 |

| Die 0 | | | | | | | |
|---|---|---|---|---|---|---|---|
| Plane 0 | | | | Plane 1 | | | |
| Even Pages | | Odd Pages | | Even Pages | | Odd Pages | |
| Row | MSB | LSB | MSB | LSB | MSB | LSB | MSB | LSB |
| 36 | 270 | 306 | 276 | 312 | 269 | 305 | 279 | 315 |
| 37 | 278 | 314 | 284 | 320 | 277 | 313 | 287 | 323 |
| 38 | 286 | 322 | 292 | 328 | 285 | 321 | 295 | 331 |
| 39 | 294 | 330 | 300 | 336 | 293 | 329 | 303 | 339 |
| 40 | 302 | 338 | 308 | 344 | 301 | 337 | 311 | 347 |
| 41 | 310 | 346 | 316 | 352 | 309 | 345 | 319 | 355 |
| 42 | 318 | 354 | 324 | 360 | 317 | 353 | 327 | 363 |
| 43 | 326 | 362 | 332 | 368 | 325 | 361 | 335 | 371 |
| 44 | 334 | 370 | 340 | 376 | 333 | 369 | 343 | 379 |
| 45 | 342 | 378 | 348 | 384 | 341 | 377 | 351 | 387 |
| 46 | 350 | 386 | 356 | 392 | 349 | 385 | 359 | 395 |
| 47 | 358 | 394 | 364 | 400 | 357 | 393 | 367 | 403 |
| 48 | 366 | 402 | 372 | 408 | 365 | 401 | 375 | 411 |
| 49 | 374 | 410 | 380 | 416 | 373 | 409 | 383 | 419 |
| 50 | 382 | 418 | 388 | 424 | 381 | 417 | 391 | 427 |
| 51 | 390 | 426 | 396 | 432 | 389 | 425 | 399 | 435 |
| 52 | 398 | 434 | 404 | 440 | 397 | 433 | 407 | 443 |
| 53 | 406 | 442 | 412 | 448 | 405 | 441 | 415 | 451 |
| 54 | 414 | 450 | 420 | 456 | 413 | 449 | 423 | 459 |
| 55 | 422 | 458 | 428 | 464 | 421 | 457 | 431 | 467 |
| 56 | 430 | 466 | 436 | 472 | 429 | 465 | 439 | 475 |
| 57 | 438 | 474 | 444 | 480 | 437 | 473 | 447 | 483 |
| 58 | 446 | 482 | 452 | 488 | 445 | 481 | 455 | 491 |
| 59 | 454 | 490 | 460 | 494 | 453 | 489 | 463 | 497 |
| 60 | 462 | 496 | 468 | 498 | 461 | 495 | 471 | 501 |
| 61 | 470 | 500 | 476 | 502 | 469 | 499 | 479 | 505 |
| 62 | 478 | 504 | 484 | 506 | 477 | 503 | 487 | 509 |
| 63 | 486 | 508 | 492 | 510 | 485 | 507 | 493 | 511 |

<u>60</u>  FIG. 6B

| Row | Die 0 | | | | | | | | Die 1 | | | | | | | |
|---|---|---|---|---|---|---|---|---|---|---|---|---|---|---|---|---|
| | Plane 0 | | | | Plane 1 | | | | Plane 0 | | | | Plane 1 | | | |
| | Even Pages | | Odd Pages | | Even Pages | | Odd Pages | | Even Pages | | Odd Pages | | Even Pages | | Odd Pages | |
| | MSB | LSB | MSB | LSB | MSB | LSB | MSB | LSB | MSB | LSB | MSB | LSB | MSB | LSB | MSB | LSB |
| 0 | 0 | 20 | 4 | 28 | 2 | 22 | 6 | 30 | 1 | 24 | 8 | 32 | 3 | 26 | 10 | 34 |
| 1 | 8 | 36 | 12 | 48 | 10 | 40 | 14 | 48 | 5 | 40 | 16 | 50 | 7 | 44 | 18 | 52 |
| 2 | 17 | ~ | 25 | ~ | 19 | ~ | 27 | ~ | 13 | ~ | 21 | ~ | 15 | ~ | 23 | ~ |
| 3 | 33 | | 43 | | 35 | | 45 | | 29 | | 39 | | 31 | | 41 | |
| 4 | 51 | ~ | ~ | | 53 | ~ | ~ | | 47 | ~ | ~ | | 49 | ~ | ~ | |
| ~ | ~ | | | | ~ | | | | ~ | | | | ~ | | | |

| Die 0 | | | | | | | | Die 1 | | | | | | | |
|---|---|---|---|---|---|---|---|---|---|---|---|---|---|---|---|
| Plane 0 | | | | Plane 1 | | | | Plane 0 | | | | Plane 1 | | | |
| Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 0 | 0 | 40 | 8 | 48 | 4 | 44 | 12 | 52 | 1 | 41 | 16 | 64 | 5 | 45 | 20 | 68 |
| 1 | 17 | 65 | 24 | ... | 21 | 69 | 28 | ... | 9 | 49 | 32 | ... | 13 | 53 | 36 | ... |
| 2 | 33 | ... | 75 | | 37 | ... | 79 | | 25 | ... | 59 | | 29 | ... | 63 | |
| 3 | 58 | | ... | | 62 | | ... | | 74 | | ... | | 78 | | ... | |
| 4 | ... | | | | ... | | | | ... | | | | ... | | | |
| ... | | | | | | | | | | | | | | | | |

| Die 2 | | | | | | | | Die 3 | | | | | | | |
|---|---|---|---|---|---|---|---|---|---|---|---|---|---|---|---|
| Plane 0 | | | | Plane 1 | | | | Plane 0 | | | | Plane 1 | | | |
| Even Pages | | Odd Pages | | Even Pages | | Odd Pages | | Even Pages | | Odd Pages | | Even Pages | | Odd Pages | |
| Row | MSB | LSB | MSB | LSB | MSB | LSB | MSB | LSB | MSB | LSB | MSB | LSB | MSB | LSB | MSB | LSB |
| 0 | 2 | 42 | 10 | 56 | 6 | 46 | 14 | 60 | 3 | 43 | 18 | 72 | 7 | 47 | 22 | 76 |
| 1 | 19 | 73 | 26 | ... | 23 | 77 | 30 | ... | 11 | 57 | 34 | ... | 15 | 61 | 38 | ... |
| 2 | 35 | ... | 67 | | 39 | ... | 71 | | 27 | ... | 51 | | 31 | ... | 55 | |
| 3 | 50 | | ... | | 54 | | ... | | 66 | | ... | | 70 | | ... | |
| 4 | ... | | | | ... | | | | ... | | | | ... | | | |
| ... | | | | | | | | | | | | | | | | |

```
┌─────────────────────────────────────────────────────────────┐
│ Determine or receive a programming order. The programming order │
│    can take into account one or more of the following rules: (a) an │
│    even odd ordering rule, (b) a programming type ordering rule, and │
│                (c) a codeword portions ordering rule.           │
│ A determining of the order of programming of the different portions │
│       of the other codewords can include (a) determine a logical │
│        programming order based upon the even odd ordering rule, the │
│ codeword portions ordering rule and the programming type ordering │
│        rule; and (b) apply a logical to physical mapping on the logical │
│    programming order to provide a physical programming order that is │
│    upheld during the programming of the interleaving of the different │
│          portions of the other codewords of the group.. 1110   │
└─────────────────────────────────────────────────────────────┘
                              │
                              ▼
┌─────────────────────────────────────────────────────────────┐
│        Receive a group of codewords to be programmed. 1120      │
└─────────────────────────────────────────────────────────────┘
                              │
                              ▼
┌─────────────────────────────────────────────────────────────┐
│ Interleave at least two portions of a first codeword of the group │
│     between at least two flash memory planes while violating at │
│   least one ordering rule out of (a) an even odd ordering rule, (b) │
│   a programming type ordering rule, and (c) a codeword portions │
│                      ordering rule. 1130                       │
└─────────────────────────────────────────────────────────────┘
                              │
                              ▼
┌─────────────────────────────────────────────────────────────┐
│   Interleave different portions of other codewords of the group │
│    between multiple flash memory planes while maintaining the │
│     even odd ordering rule, the programming type ordering rule │
│         and the codeword portions ordering rule. 1140        │
└─────────────────────────────────────────────────────────────┘
                              │
                              ▼
┌─────────────────────────────────────────────────────────────┐
│   Read the group of codewords (or a part of the group) while at │
│   least partially compensating for excessive errors that may │
│       result from the violation of one or more rule. 1310    │
└─────────────────────────────────────────────────────────────┘
```

INTERLEAVING CODEWORD PORTIONS BETWEEN MULTIPLE PLANES AND/OR DIES OF A FLASH MEMORY DEVICE

RELATED APPLICATIONS

This application is a NONPROVISIONAL of, claims priority and incorporates by reference U.S. provisional patent application No. 61/420,654, filed Dec. 2, 2010.

BACKGROUND

Flash memory devices include multiple rows. A programming of one row can affect the information stored in another row.

There is a need to provide efficient flash memory programming schemes.

SUMMARY

In an embodiment of the present invention, a non-transitory computer readable medium may be provided and may store instructions for: (i) interleaving at least two portions of a first codeword of the group between at least two flash memory planes while violating at least one ordering rule out of (a) an even odd ordering rule, (b) a programming type ordering rule, and (c) a codeword portions ordering rule; and (ii) interleaving different portions of other codewords of the group between multiple flash memory planes while maintaining the even odd ordering rule, the programming type ordering rule and the codeword portions ordering rule. The multiple flash memory planes may include the at least two memory flash memory planes. The codeword portions ordering rule determines an order of programming of different portions of a same codeword. The even odd ordering rule determines an order of programming codeword portions to even pages and odd pages of the flash memory planes. The programming type ordering rule determines an order of programming types that differ from each other by significance.

The computer readable medium may store instructions for violating the at least one ordering rule for each type of codewords of the different types of codewords.

The computer readable medium may store instructions for programming the at least two portions to rows that have a same row number.

The computer readable medium may store instructions for programming the at least two portions to rows that have different row numbers.

The computer readable medium may store instructions for programming the group of codewords to rows that define a flash memory block per each flash memory plane. The interleaving of the at least two portions may include programming the at least two portions to a row at a start of a flash memory block and to another row at an end of another flash memory block.

The multiple flash memory planes may belong to a same flash memory die.

The multiple flash memory planes may belong to multiple flash memory dies.

The computer readable medium may store instructions for violating only the even odd ordering rule.

The computer readable medium may store instructions for violating only the programming type ordering rule.

The computer readable medium may store instructions for violating only the codeword portions ordering rule.

The even odd ordering rule may be indifferent to a programming order between odd and even pages.

The computer readable medium may store instructions for interleaving each codeword between at least four flash memory planes.

The computer readable medium may store instructions for: (i) determining a logical programming order based upon the even odd ordering rule and the programming type ordering rule; and (ii) applying a logical to physical mapping on the logical programming order to provide a physical programming order that is upheld during the programming of the interleaving of the different portions of the other codewords of the group.

The computer readable medium may store instructions for at least partially compensating for an expected outcome of the violating of the at least one ordering rule during the interleaving of the at least two portions of the first codeword.

Additional embodiments of the invention include a method for programming a group of codewords, each codeword may include multiple codeword portions. The method may include: (i) interleaving at least two portions of a first codeword of the group between at least two flash memory planes while violating at least one ordering rule out of (a) an even odd ordering rule, (b) a programming type ordering rule, and (c) a codeword portions ordering rule; and (ii) interleaving different portions of other codewords of the group between multiple flash memory planes while maintaining the even odd ordering rule, the programming type ordering rule and the codeword portions ordering rule. The multiple flash memory planes may include the at least two memory flash memory planes. The codeword portions ordering rule determines an order of programming of different portions of a same codeword. The even odd ordering rule determines an order of programming codeword portions to even pages and odd pages of the flash memory planes. The programming type ordering rule determines an order of programming types that differ from each other by significance.

The method may include violating the at least one ordering rule for each type of codewords of the different types of codewords.

The interleaving of the at least two portions may include programming the at least two portions to rows having a same row number.

The interleaving of the at least two portions may include programming the at least two portions to rows having different row numbers.

The method may include programming the group of codewords to rows that define a flash memory block per each flash memory plane. The interleaving of the at least two portions may include programming the at least two portions to a row at a start of a flash memory block and to another row at an end of another flash memory block.

The multiple flash memory planes may belong to a same flash memory die.

The multiple flash memory planes may belong to multiple flash memory dies.

The interleaving of the at least two portions may include violating only the even odd ordering rule.

The interleaving of the at least two portions may include violating only the programming type ordering rule.

The interleaving of the at least two portions may include violating only the codeword portions ordering rule.

The even odd ordering rule may be indifferent to a programming order between odd and even pages.

The method may include interleaving each codeword between at least four flash memory planes.

The method may include determining an order of programming of the different portions of the other codewords by: (a) determining a logical programming order based upon the even odd ordering rule and the programming type ordering rule; and (h) applying a logical to physical mapping on the logical programming order to provide a physical programming order that is upheld during the programming of the interleaving of the different portions of the other codewords of the group.

The method may include compensating for an expected outcome of the violating of the at least one ordering rule during the interleaving of the at least two portions of the first codeword.

Additional embodiments of the invention include a system that may include (a) at least one flash memory die that comprises multiple flash memory planes; and (b) a memory controller. The memory controller may be arranged to: (i) interleave at least two portions of a first codeword of the group between at least two flash memory planes while violating at least one ordering rule out of (a) an even odd ordering rule, (b) a programming type ordering rule, and (c) a codeword portions ordering rule; and (ii) interleave different portions of other codewords of the group between the multiple flash memory planes while maintaining the even odd ordering rule, the programming type ordering rule and the codeword portions ordering rule. The multiple flash memory planes may include the at least two memory flash memory planes. The codeword portions ordering rule determines an order of programming of different portions of a same codeword. The even odd ordering rule determines an order of program codeword portions to even pages and odd pages of the flash memory planes. The program type ordering rule determines an order of program types that differ from each other by significance.

The memory controller may be arranged to violate the at least one ordering rule for each type of codewords of the different types of codewords.

The memory controller may be arranged to program the at least two portions to rows having a same row number.

The memory controller may be arranged to program the at least two portions to rows having different row numbers.

The memory controller may be arranged to program the group of codewords to rows that define a flash memory block per each flash memory plane. The memory controller may be arranged to program the at least two portions to a row at a start of a flash memory block and to another row at an end of another flash memory block.

The multiple flash memory planes may belong to a same flash memory die.

The multiple flash memory planes may belong to multiple flash memory dies.

The memory controller may be arranged to violate only the even odd ordering rule.

The memory controller may be arranged to violate only the program type ordering rule.

The memory controller may be arranged to violate only the codeword portions ordering rule.

The even odd ordering rule is indifferent to a program order between odd and even pages.

The memory controller may be arranged to interleave each codeword between at least four flash memory planes.

The memory controller may be arranged to: (a) determine a logical program order based upon the even odd ordering rule and the program type ordering rule; and (b) apply a logical to physical mapping on the logical program order to provide a physical program order that is upheld during the interleaving of the different portions of the other codewords of the group.

The system may include an encoder that may be arranged to at least partially compensate for an expected outcome of violating of the at least one ordering rule during the interleaving of the at least two portions of the first codeword.

The programming type ordering rule may define at least two different decoupling sequence steps for at least two different programming types.

The size of the different decoupling sequence steps can be set according to sensitivity of the different types of programming to noise.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1C illustrate a dual-die dual-plane mapping of page number mapping to physical pages according to an embodiment of the invention;

FIGS. 3A-3C and 4A-4C illustrate dual-die dual-plane mappings with decoupling sequences of step sizes of 1 and 4 respectively, according to various embodiments of the invention;

FIGS. 5A-5B and 6A-6B illustrate single-die dual-plane mappings with decoupling sequences of step sizes of 1 and 4 respectively, according to various embodiments of the invention;

FIG. 8 illustrates an example of dual-die dual-plane mapping according to an embodiment of the invention;

FIG. 10 illustrates quad-die dual-plane mapping according to an embodiment of the invention;

FIG. 13 illustrates a method for interleaving codewords and reading codewords according to an embodiment of the invention;

Figure 2:
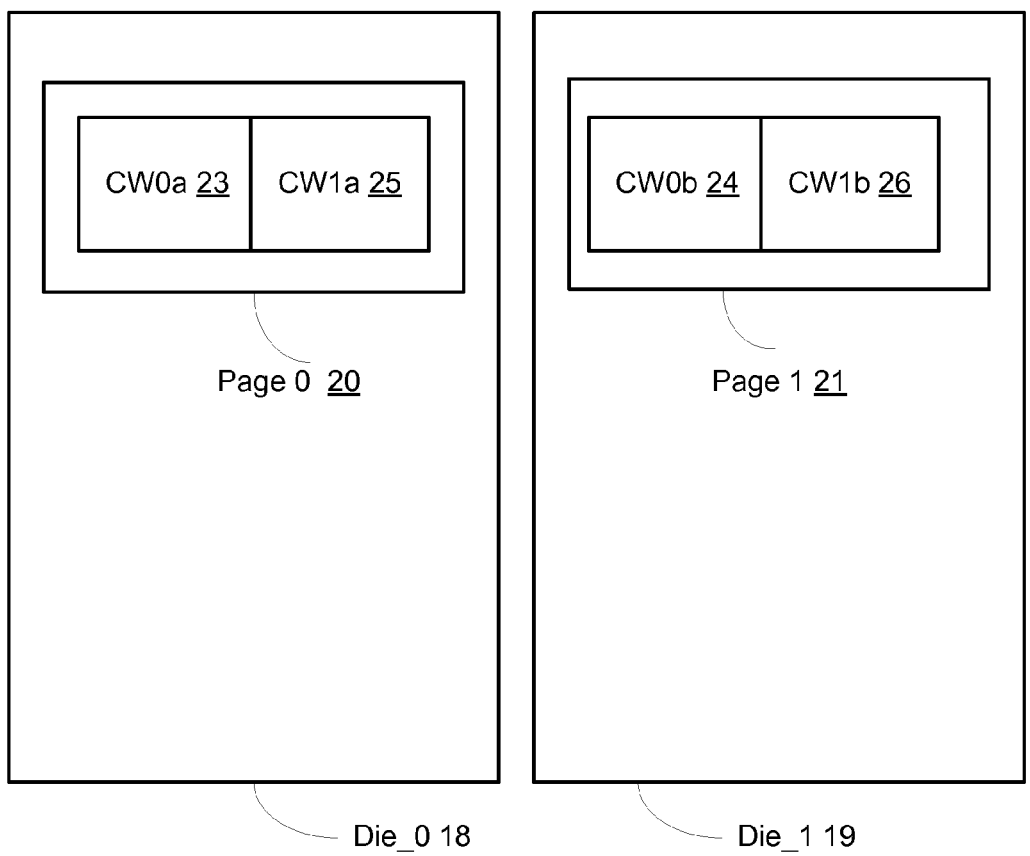
FIG. 2 illustrates a codewords interleaving example, between a pair of pages, located in two separate dies according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It should be appreciated, however, that the present methods, systems and computer readable media may be practiced without these specific details. In other instances, well-known methods, procedures, and components have not been described in detail so as not to obscure the present invention.

The following text refers to flash memory devices. It is noted that the described and the claimed methods, systems and computer readable mediums can be applied mutatis mutandis to other types of nonvolatile memory devices.

The following text refers to pages and blocks. It is noted that other partitions of the virtual and physical flash memory devices can be applied.

There are different types of programming that differ from each other by their significance. Non limiting examples of different types of programming may include a most significant bit (MSB) programming, a central significant bit (CSB) programming and a least significant bit (LSB) programming.

Figure 16:
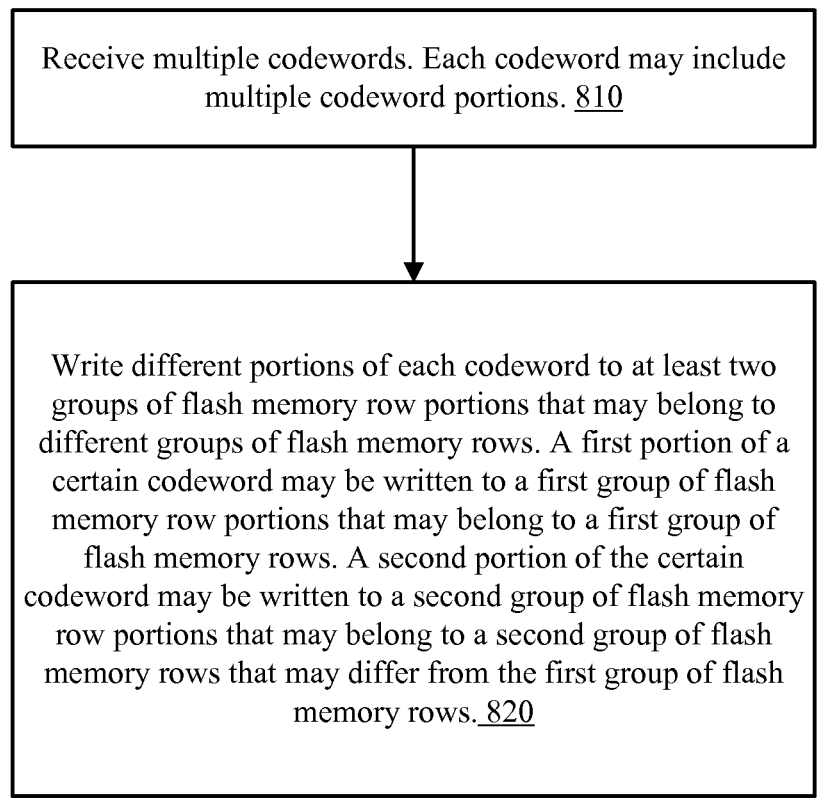
FIG. 16 illustrates a method for receiving and writing codewords according to an embodiment of the invention.
Figure 17:
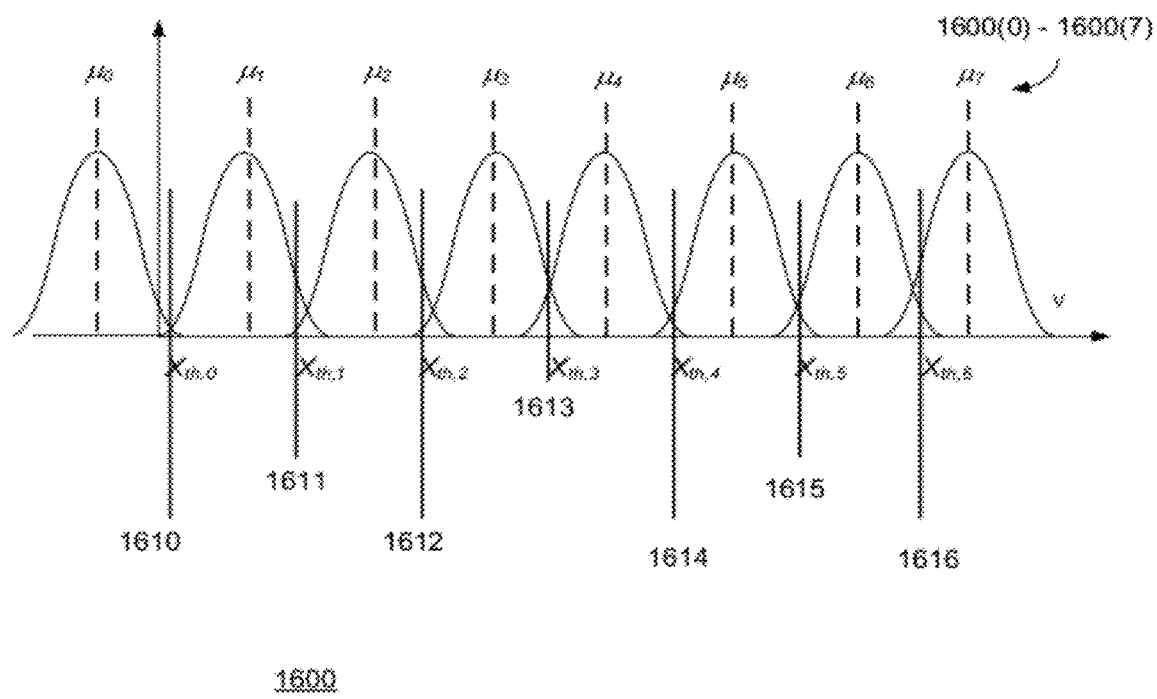
FIG. 17 illustrates a threshold voltage distribution and read thresholds for a three bit per cell flash memory cell.

FIG. 17 illustrates a threshold voltage distribution 1600 of a three bit per cell (bpc) flash memory cell. The threshold voltage distribution 1600 includes multiple lobes 1600(0)-1600(7). FIG. 16 also illustrates read thresholds 1610-1616.

Each of these read thresholds is positioned between two adjacent lobes. The read thresholds include a MSB read threshold 1613, CSB read thresholds 1611 and 1615, and LSB read thresholds 1610, 1612, 1614 and 1616.

LSB, CSB and MSB programming are arranged to program flash memory cells to the appropriate lobe. The MSB programming is responsive to the MSB read threshold. The CSB programming is responsive to the CSB read thresholds. The LSB programming is responsive to LSB programming thresholds. In flash memory cells that may store more than three bits per cell—there are defined multiple CSB programming types of different significance.

The different types of programming are associated with different types of logical pages. Thus, a MSB page represents a content of a flash memory device page that was programmed by MSB programming. The same applied to a LSB page and to a CSB page.

A flash memory device may include multiple flash memory rows and can be partitioned to odd pages and even pages. The flash memory cells of odd and even pages may be proximate to each other.

According to an embodiment of the invention there are provided one or more ordering rules. Each ordering rule can be applied on a majority of codeword portions to be programmed. Some codeword portions are programmed while violating at least one ordering rule so that the majority of the codeword portions can be programmed while maintaining all of the one or more ordering rules.

A violation of an ordering rule can be seen as an exception of an ordering rule. It should be appreciated that defining ordering rules that include one or more exceptions to the programming of one or more codeword portions is equivalent to a violation of ordering rules that are applied on the majority of codewords.

Usually, the process of flash memory programming includes encoding data to be resilient to read errors. Even and odd pages may provide different resiliency to read errors—and can be regarded as being of different reliability.

The difference in read reliability can result from the order of programming the odd and even pages—usually the odd pages are programmed after the even pages, during which the even pages suffer additional noise. This phenomenon is known as program disturbs due to inherent strong coupling between even and odd pages within the same row.

A flash memory die can include one or more flash memory planes. Different flash memory planes of a flash memory die can be accessed independently.

For simplicity of explanation rows of different flash memory planes (hereinafter-planes) that share the same row number may be referred in the following description as belonging to the same row. Rows that belong to different flash memory dies that have the same row number can be referred to as the same row.

In the following text a size of the decoupling sequence step is defined as the difference between certain row numbers—regardless of the plane or die that includes these rows.

Flash memory planes that belong to the same flash memory die can differ from other each other by one or more characteristics (for example—have different threshold voltage distributions). This difference can be at least partially compensated by interleaving codewords between different flash memory planes.

Different flash memory dies can differ from the other by one or more characteristics. This difference may be at least partially compensated by interleaving codewords between different flash memory dies.

When multi-plane multi-die programming is possible, then it may be desirable to interleave codewords across multiple dies and maybe across even and odd pages. Some programming orders may require using large buffers for holding encoded data prior to programming. This is since such interleaving would usually require programming all MSB pages and only then continues to LSB pages, in order to eliminate violation of programming ordering such as even-odd codeword interleaving.

According to various embodiments of the invention a multi-die multi-plane programming scheme may be provided such that the buffering requirements are minimized. This multi-die multi-plane programming scheme may enable a generic decoupling sequence for multi-level cell (MLC) devices, and a generic page/row permutation.

A decoupling sequence, in MLC flash memory devices, refers to the programming sequence order of different page types, such as most significant bits (MSB) and least significant bits (LSB) pages (known also as lower and upper pages, respectively). To avoid program disturbs it is usually desired to perform MSB programming of several rows, and only then perform LSB programming of rows of already MSB programmed rows. This is because of the coupling effects between neighboring rows.

When the decoupling sequence step size is zero, after every row MSB programming, an LSB row programming of the same row takes place. This means that right after LSB row programming, the next row is programmed with MSB data. This may induce a relatively strong noise on the last LSB programmed pages. Therefore, increasing the decoupling sequence step size can reduce the programming noise.

FIGS. 1A-1C illustrate a table 10 that demonstrates a dual-die and dual-plane programming scheme that uses a page permutation for programming four different planes of two flash memory dies (each flash memory die having two planes).

The leftmost column of table 10 represents the row numbers. There are two dies (die 0 and die 1), each die includes two planes (plane 0 and plane 1). Each plane includes odd pages and even pages. Each of these even and odd pages includes an MSB page and LSB page (each of the pages can be MSB and LSB programmed).

Accordingly, table 10 has sixteen columns (in addition to the left most column) that represent the programming order of each page taken into account MSB programming and LSB programming. The numbers in these sixteen columns represent the programming order.

It is assumed that codewords have different portions and that different portions of the same codewords are programmed in a sequential manner and according to the programming order.

An example of an interleaving scheme includes interleaving a codeword over every 4 consecutive pages, such that the first codeword is programmed over pages 0-3. Another codeword can be programmed over pages 4-7.

In order to eliminate using long codewords, while keeping this interleaving scheme, every four pages may contain 8 interleaved codewords (where every codeword is split into four pages). In such a case the length of every codeword is exactly half of a single page length (assuming all pages have identical sizes).

Table 10 illustrates the programming order in a flash memory block. The flash memory block spans across flash memory planes and flash memory dies.

Table 10 illustrates an example where the decoupling sequence step size is equal to the number of rows of a flash memory block. In other words, all MSB pages within the flash memory block are programmed first. Once all MSB pages of the block are programmed, the LSB pages of the block are programmed, using the same page ordering. It is noted that codewords may be interleaved between even page numbers and odd page numbers.

The interleaving does not require additional memory buffers as it is done between two pages which lie on different dies. Codewords interleaving of the two first codewords according to an embodiment of the invention is demonstrated in FIG. 2.

FIG. 2 illustrates page_0 (20) of die_0 (18) and page_1 (21) of die_1 (19). These two pages store two codewords, codeword 0 and codeword 1, which are both interleaved over these two pages. One half of codeword 0 (CW0a 23) is programmed to page_0, and another half (CW0b 24) is programmed onto page_1. The same programming is applied on codeword 1, which is separated into codeword halves CW1a (25) and CW1b (26).

As may be noticed from FIGS. 1A-1C and FIG. 2, that page_0 is an even page on Die_0, and page_1 is also an even page on Die_1. In this exceptional case the codewords interleaving is across two even pages. This exception (also referred to as a violation of an even odd ordering rule) allows other codewords portions to be interleaved while maintaining the even odd ordering rule.

It is noted that the programming includes programming every even page before every odd page.

When interleaving codewords across page_2K and page_(2K+1), where K=0, 511, most codewords are programmed while maintaining even/odd interleaving across dies.

Other exceptions to the ordering rules can occur at the end of the block which interleave between two odd pages. These exceptions complement the exceptions at the start of the block.

According to an embodiment of the invention the interleaving of a first codeword can include interleaving the portions of the first codeword between even and odd pages that belong to the first and last row of the block.

This may require buffering the one or more first codeword portions to be programmed at the end of the block but eliminates the interleaving order violations. This programming can be regarded as a violation of the codeword portions ordering rule (that is applied on a majority of codewords and even on almost all codewords) that may require sequential programming of different portions of the same codeword.

The programming scheme shown in FIGS. 1A-1C may cause that a write throughput at certain time intervals is defined by the largest program time (tPROG), which is usually the LSB programming tPROG. It becomes even more noticeable in three bits per cell flash memory devices, where the tPROG difference between the LSB programming and the MSB programming is dramatically higher. That is since LSB pages are programmed sequentially along the block, after all MSB pages are already programmed.

According to an embodiment of the invention, it is suggested to program a few MSB rows, and then program the first LSB row. Thus—it may be desired to use a decoupling sequence step of size S that is smaller than the number of rows of the entire block.

Thus—after completing a LSB programming of the S first rows (the first time the decoupling sequence step is obtained), initiating a MSB programming. This may be followed by a LSB programming—while maintaining the decoupling sequence step.

FIGS. 3A-3C illustrates a dual-die dual-plane mapping of page numbers to physical pages with a decoupling sequence of step size of 1, according to an embodiment of the invention.

Table 30 shown in FIGS. 3A-3C illustrates the programming order.

This programming scheme (referred to dual-die dual-plane programming sequence, with a dual die interleaving permutation) allows almost every page couple [i.e. page_2K and page_(2K+1), K=0, . . . , 511] to be mapped to physically even and odd pages, which enables interleaving of codewords across pairs of pages over physical even/odd pages.

In addition—MSB and LSB pages are programmed with a decoupling sequence step size of 1, which means that LSB pages are programmed only after at least two MSB rows are completely programmed. Thus there is at least one row spacing between a new programmed MSB row, and the previous LSB programmed rows.

It is noted that in contrast with traditional (prior art) decoupling sequences some MSB rows may be incompletely programmed before starting to program the LSB rows. This is exemplified in FIG. 3, where the programming begins with MSB pages.

The first LSB programmed page is page_20. When it is programmed, the first two rows (0 and 1) are already fully MSB programmed, however, some pages on row 2 are programmed as well, due to the multi-die permutation, i.e. pages 13, 15, 16 and 18 are programmed on row 2, when the LSB is programmed.

FIG. 4 illustrates a dual-die dual-plane mapping of page numbers to physical pages with the suggested decoupling sequence of step size 4, according to an embodiment of the invention. The programming order is illustrated by table 40.

This programming scheme allows almost every page couple [i.e. page_2K and page_(2K+1), K=0, 511] to be mapped to physically even and odd pages, which enables interleaving of codewords across pairs of pages over physical even/odd pages.

MSB and LSB page types are programmed with a decoupling sequence step size of 4, which means that LSB pages are programmed only after at least five MSB rows are completely programmed. Thus there is at least four rows spacing between a new programmed MSB row, and the previous LSB programmed rows.

FIGS. 5 and 6 demonstrate the same technique for a multi-plane interleaving of codewords for a single-die configuration, according to various embodiments of the invention.

In FIG. 5 (table 50), a single-die dual-plane mapping of page numbers to physical pages with the suggested decoupling sequence of step size 1 is illustrated.

In FIG. 6 (table 60), a single-die dual-plane mapping of page numbers to physical pages with the suggested decoupling sequence of step size 4 is described. The interleaving of codewords can be done for every pair of even and odd indices, for example indices 0 and 1, then the next codeword can be mapped to indices 2 and 3

Figure 7:
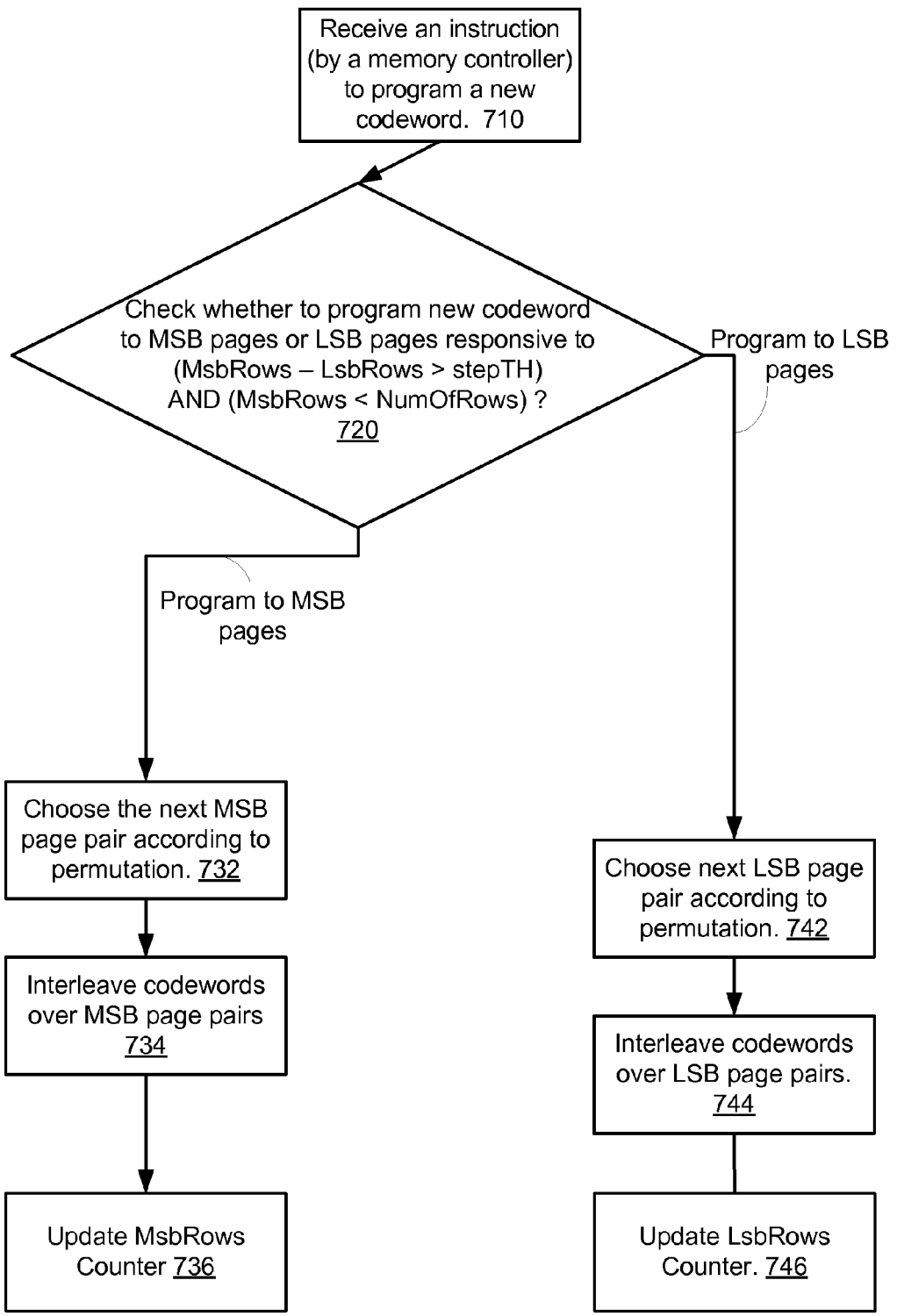
FIG. 7 illustrates a flow chart of a method for programming according to an embodiment of the invention.

FIG. 7 illustrated a method 700 for interleaving of codewords according to an embodiment of the invention.

Method 700 provides a non-limiting example of programming to a 2 bpc flash memory cells by MSB programming and LSB programming with a decoupling step size stepTH predefined, while allowing multi-plane multi-die interleaving.

For simplicity of explanation FIG. 7 illustrates an interleaving of codeword portions that maintains all the ordering rules. Thus, the stages of method 700 are repeated for the majority of codewords. It is noted that method 700 includes (not shown) stages of programming while violating one or more ordering rules.

Method 710 starts by stage 710 of receiving an instruction (by a memory controller) to program a new codeword.

Stage 710 is followed by stage 720 of checking whether to program the new codeword to MSB pages (MSB programming) or LSB pages (LSB programming).

The checking is responsive to:
(A) The decoupling sequence step size stepTH (MsbRows-LsbRows>stepTH), wherein MsbRows is the number of fully programmed MSB rows, and LsbRows is the number of fully programmed LSB rows; and
(B) The overall number of rows (NumOfRows) allocated for the programming.

If MSB programming covered the overall number of rows then the remaining programming should be LSB programming (MsbRows<NumOfRows).

If there is a sufficiently large spacing, i.e. the number of fully programmed MSB rows is larger than the number of fully programmed LSB rows by more than the configured decoupling sequence step size, denoted in by stepTH, and then an additional LSB pages may be programmed.

Clearly, when all MSB rows are already programmed, then the residual LSB pages are programmed according to the page mapping permutation. After interleaving of the codewords across multiple physical pages and programming the counter of MSB/LSB full rows is updated—to reflect the current number of full MSB/LSB programmed rows.

If all MSB rows are not already programmed and if the decoupling sequence step size is not maintained then stage 720 is followed by stages 732, 734 and 736. Else, stage 720 is followed by stages 742, 744 and 746.

Stage 732 includes choosing the next MSB page pair according to permutation.

Stage 734 includes interleaving codewords over MSB page pairs.

Stage 736 includes updating MsbRows Counter.

Stage 742 includes choosing the next LSB page pair according to permutation.

Stage 744 includes interleaving codewords over LSB page pairs.

Stage 746 includes updating LshRows Counter.

According to an embodiment of the invention the decoupling sequence definition and algorithm is extended to any number of bits-per cell flash memory devices. For example, in a 3 bpc flash memory device there are three types of pages to program—MSB pages, CSB pages and LSB pages.

According to an embodiment of the invention a process of programming can include:
 i. Program MSB pages until a decoupling sequence step is obtained, then program CSB pages.
 ii. When there are sufficiently many CSB programmed rows, i.e. at least decoupling sequence step programmed CSB rows, and then program the first LSB pages.
 iii. Continue programming MSB/CSB/LSB while maintaining the decoupling sequence step size for CSB w.r.t MSB and for LSB w.r.t CSB.

Yet according to another embodiment of the invention, the size of the decoupling sequence step can be changed between types of programming. For example, when programming a three bit-per cell device (three types of programming available), the size of the decoupling sequence step for CSB programming differs from the size of the decoupling sequence step for LSB programming. Conveniently, the size of the decoupling sequence step increases as the significance of the bit decreases.

The sizes of the decoupling sequence steps associated with different types of programming may be adapted to the sensitivity to noises to these different types of programming. For example, LSB programming is usually the most sensitive type of programming to program disturbs from neighboring rows and should be associated with the largest decoupling sequence step.

When there are J different types of programming (associated with bits of J different significance levels) then up to (J−1) different decoupling sequence step sizes can be defined. It is noted that fewer than (J−1) different decoupling sequence step sizes can be defined—for example if at least a pair of programming types share the same decoupling sequence step size.

For example, in programming a 3 bpc flash memory cells two different decoupling sequence step sizes can be defined.

According to another embodiment of the invention includes an extension of the page ordering to any type of row order. Thus, any mapping shown by any tables of any of the figures may reflect a mapping to a logical row number, while the physical row order may be different, and be defined by an additional mapping.

According to yet another embodiment of the invention a method can include interleaving of codewords among MSB and LSB page pairs. The method may use a similar decoupling sequence for page programming. Instead of interleaving over even/odd pages of different dies, the codeword interleaving may be applied among MSB and LSB pages. As this is not feasible in general for all page pairs since MSB pages must be programmed before the LSB pages, there will be exceptions at the first row of the block.

Such a programming sequence is illustrated in FIG. 8 (table 80), with a decoupling sequence of a step size of 1. This programming sequence includes programming a LSB page while keeping a single row space from the next MSB page to be programmed. This programming sequence may interleave a codeword over page_2K and page_(2K+1), where K=0, 511.

As may be noticed, the first two rows are programmed with MSB pages before the interleaving between MSB and LSB pages begins.

The first programmed LSB page is page_20, which holds a codeword interleaved with MSB page_21. The decoupling sequence step size of at least 1 row is maintained till the end of the block. An interleaving exception will occur by the end of the block, where the last few codewords will be interleaved over pairs of LSB pages. A possible drawback of this approach is the fact that the highest expected errors are on even LSB pages, and those are interleaved with odd MSB pages, where all MSB pages usually suffer less errors since a single read threshold is required.

It is noted that instead of breaking the MSB/LSB interleaving sequence at the beginning and end of a block, the interleaving may be done among different blocks, where the last LSB pages are interleaved with the first MSB pages of a new block. This maintains MSB/LSB interleaving for most page pairs on the flash memory device.

According to another embodiment of the invention the interleaving of codewords is done over multiple devices, and multiple pages. That is, the examples and methods presented earlier are extendible to more than two pairs of pages for codewords' interleaving. For example, every codeword may be interleaved over four pages. Thus if the four pages can lie on separate devices, a higher diversity interleaving can be obtained.

Figure 9:
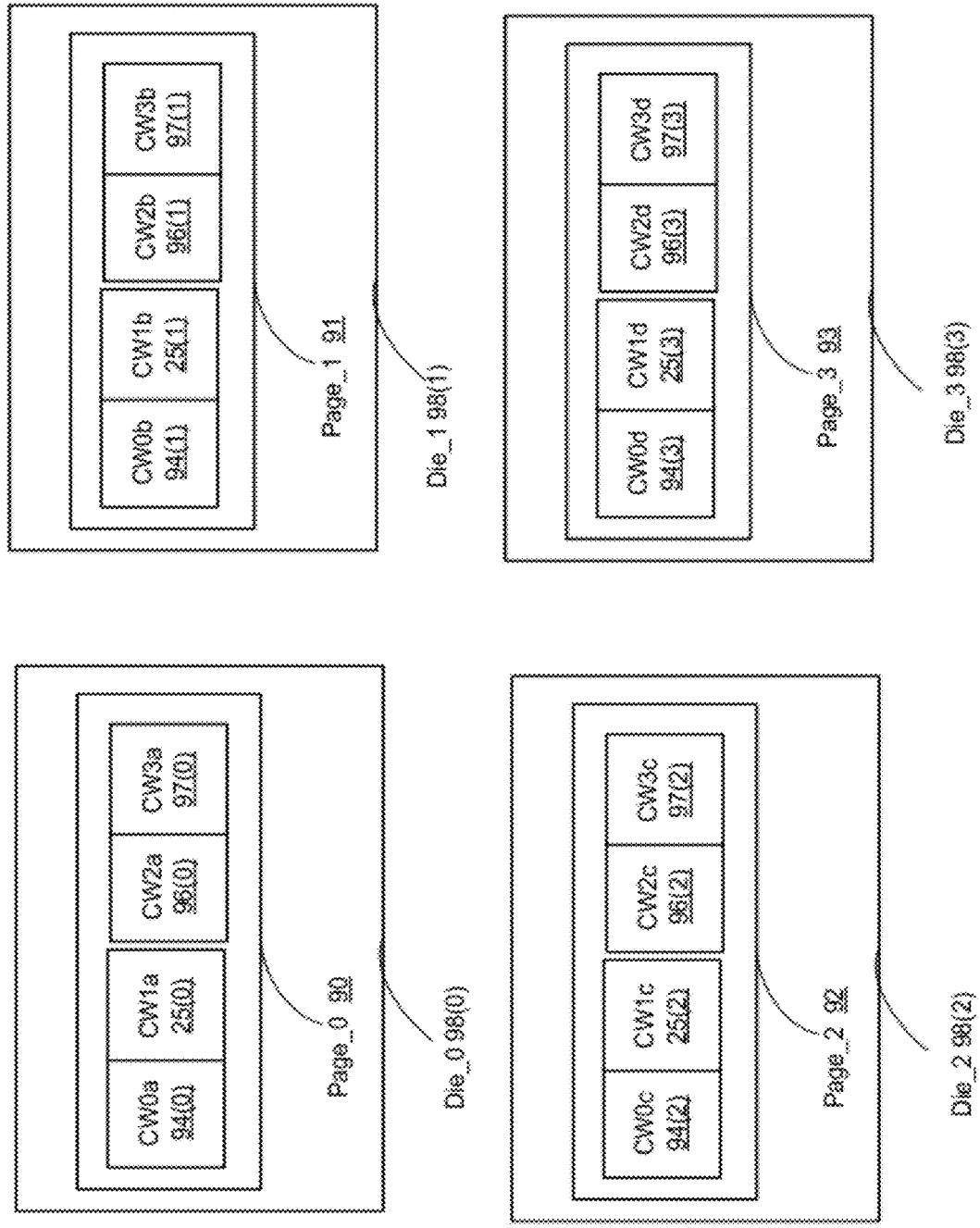
FIG. 9 illustrates an interleaving of codewords over four pages of two dies according to an embodiment of the invention.

FIG. 9 illustrates an interleaving of four codewords over four pages 90-93 that belong to four different flash memory dies 98(0)-98(3) according to an embodiment of the invention.

Pages 0-3 (90-93) store 4 codewords, codeword 0 codeword 1, codeword 2 and codeword 3, which are all interleaved over the 4 pages. The first fourth of codeword 0, denoted by CW0a 94(0), is programmed to page_0 (90), another fourth of codeword 0, denoted by CW0b 94(1), is programmed to page_1 (91), another fourth, denoted by CW0c 94(2), is programmed to page_2 (92), and the last fourth, denoted by CW0d 94(3), is programmed to page_3 (93). Other codewords are also interleaved between four flash memory dies 98(0)-98(3).

FIG. 10 illustrates a 4-die interleaving scheme according to an embodiment of the invention.

FIG. 10 includes table 100. As may be noticed from FIG. 10, with interleaving over every 4 consecutive pages, most of the codewords are interleaved over even/odd MSB/LSB pages, where every page is programmed to a different die. As may be noticed, the decoupling sequence like defined earlier is maintained, where here the step is of size of 1, and only after two MSB rows are full the LSB programming starts, where the LSB and MSB interleaving includes also the even/odd interleaving, and obtains averaging over 4 dies for nearly all pages. The concept is extendible within the framework of this invention to any number of dies, any decoupling step, any row permutation, etc.

According to various embodiments of the invention the mentioned above schemes can be extended to 3 bpc devices. In the case of 3 pbc, the interleaving among page types is MSB/LSB and the CSBs are self interleaved (only even/odd). It is clearly extendible to any n-bits per cell devices following the same guidelines introduced in this invention.

Each of the mentioned above schemes can be executed by a device that may include a flash memory device and a memory controller. The memory controller controls the execution of each of the mentioned above schemes or a combination of such schemes.

Each of the mentioned above schemes can be executed by a device that may include a computer or a memory controller that executes instructions stored in a non-transitory computer readable medium.

Figure 11:
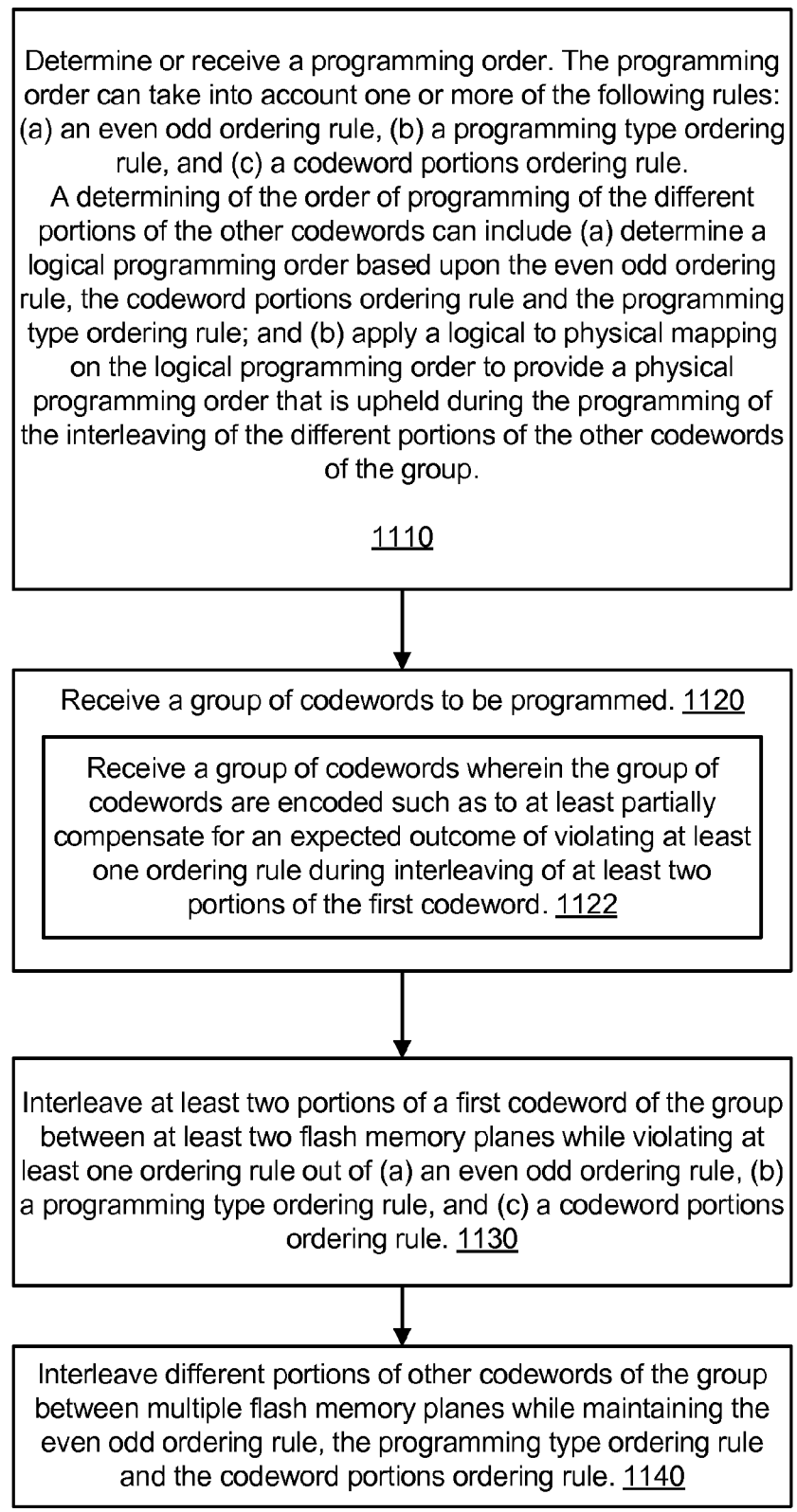
FIGS. 11 and 12 illustrate methods for interleaving codewords according to various embodiments of the invention.

FIG. 11 illustrates method 1100 for interleaving codewords according to an embodiment of the invention.

Method 1100 may start by stage 1110 that may include determining or receiving a programming order.

The programming order can take into account one or more of the following rules: (a) an even odd ordering rule, (b) a programming type ordering rule, and (c) a codeword portions ordering rule.

The even odd ordering rule determines an order of programming codeword portions to even pages and odd pages of the flash memory planes. The programming type ordering rule determines an order of programming types that differ from each other by significance. The codeword portions ordering rule determines an order of programming of different portions of a same codeword.

The programming order may start (or may include) a violation of one (or more) of these rules for programming two or more portions of a limited number of codeword portions and then maintain all of these rules when programming a much larger number of codeword portions. The violation facilitates maintaining the rules for other codewords (or other portions of the codewords).

For simplicity of explanation it will be assumed that the violation occurs when programming two or more portions of a first codeword. The first codeword can be the first codeword that is being programmed to a flash memory block but this is not necessarily so. It is noted that the violation can occur for more than a single codeword (as illustrated in FIG. 1) and then the violation can be applied for two or more codeword portions of the first codeword while other portions of that first codeword can be programmed while maintaining the rules.

Stage 1110 may include determining an order of programming of the different portions of the other codewords by: (a) determining a logical programming order based upon the even odd ordering rule, the codeword portions ordering rule and the programming type ordering rule; and (b) applying a logical to physical mapping on the logical programming order to provide a physical programming order that is upheld during the programming of the interleaving of the different portions of the other codewords of the group.

Stage 1110 is followed by stage 1120 of receiving a group of codewords to be programmed.

Stage 1120 can be followed by stages 1130 and 1140.

FIG. 11 illustrates stage 1120 as being followed by stages 1130 and 1140. FIG. 11 illustrates stage 1130 as being followed by stage 1140 but this is not necessarily so. For example, the interleaving may occur before receiving the entire group of codewords. Yet for another example, the violation can occur after some codewords were programmed while maintaining the rules. Referring to the last example, violation of rules during the first CSB programming can occur after maintaining all the rules for MSB programming of one or more previous codewords.

Stage 1130 includes interleaving at least two portions of a first codeword of the group between at least two flash memory planes while violating at least one ordering rule out of (a) an even odd ordering rule, (b) a programming type ordering rule, and (c) a codeword portions ordering rule. Thus stage 1130 can include applying on the at least two portions of the first codeword other rules than those applied on most of the codeword portions.

Stage 1130 may include at least one of the following:

(A) Programming the at least two portions to rows having a same row number.

(B) Programming the at least two portions to rows having different row numbers.

(C) Programming the at least two portions to a row at a start of a flash memory block and to a row at the end of the flash memory block. These rows can belong to the same flash memory plane or to different flash memory planes. The entire group of codewords is programmed to rows that define the flash memory block.

(D) Violating only the even odd ordering rule. See, for example, FIGS. 1A-1C and 3A-3C.

(E) Violating only the programming type ordering rule. See, for example, FIG. 8.

(F) Violating only the codeword portions ordering rule. For example—programming a first portion of a first codeword to an odd MSB page of a first row of a block of first flash memory plane and programming a second portion of the first codeword to an even MSB page of a last row of a corresponding block Stage 1140 includes interleaving different portions of other codewords of the group between multiple flash memory planes while maintaining the even odd ordering rule, the programming type ordering rule and the codeword portions ordering rule.

The multiple flash memory planes (of stage 1140) may include the at least two memory flash memory planes (of stage 1130).

It is noted that the violation of a rule can lead to increased error rate in the codeword portions that were programmed during this violation. This can be at least compensated by changing at least one encoding parameters of these codeword portions—for example by allocating more redundancy bits for these codeword portions in relation to the redundancy bits allocated to codeword portions that are programmed while maintaining the rules. Additionally or alternatively, the compensation may involve applying stronger error correction decoding, reading these codeword portions multiple times, performing soft decoding and any other methods for compensating (at least partially) for the violations.

This is illustrated by stage 1122 of receiving a group of codewords wherein the group of codewords are encoded such as to at least partially compensate for an expected outcome of the violating of the at least one ordering rule during the interleaving of the at least two portions of the first codeword.

Figure 12:
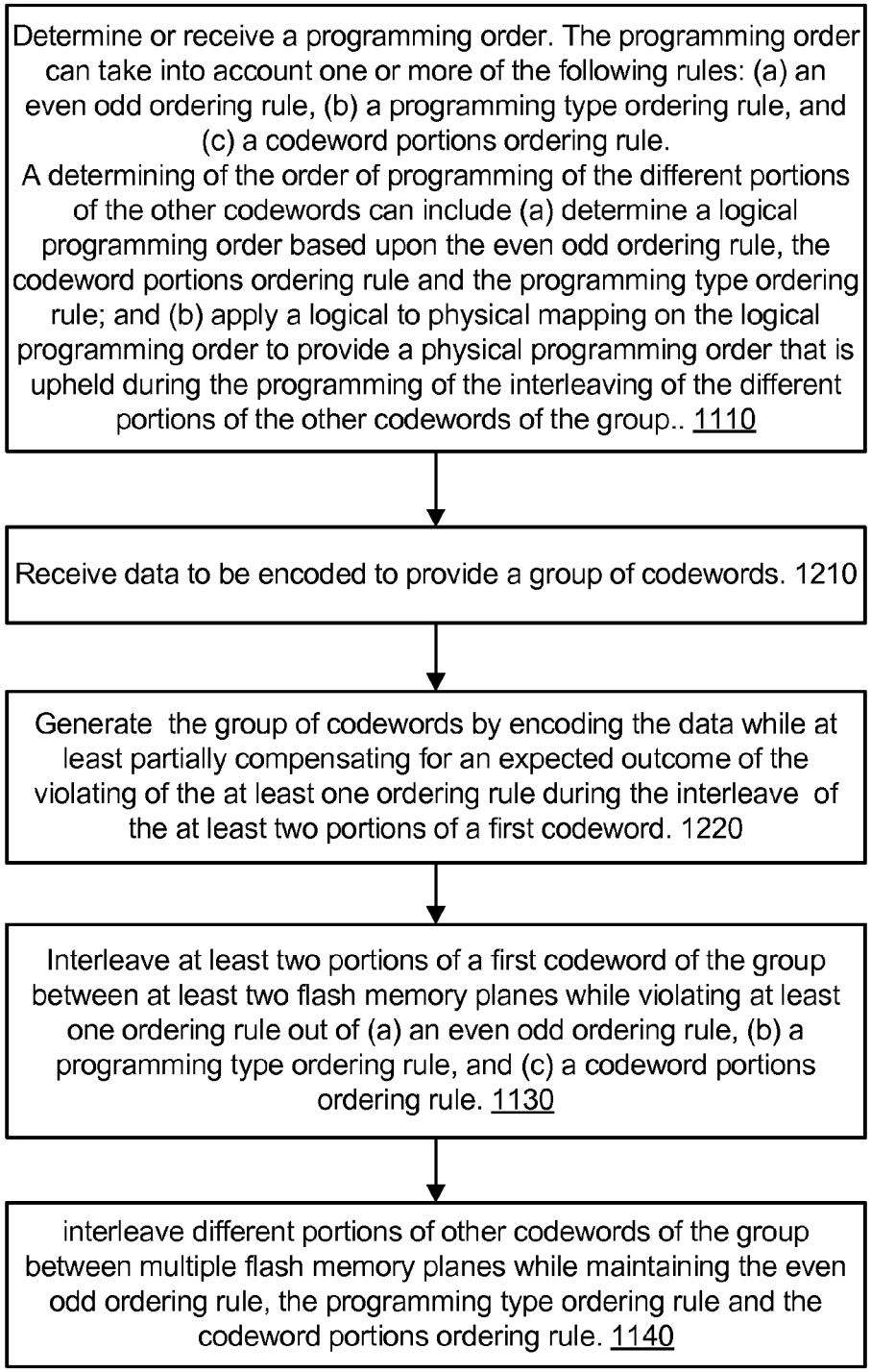

FIG. 12 illustrates method 1200 for interleaving codewords according to an embodiment of the invention.

Method 1200 differs from method 1100 of FIG. 11 by including stages 1210 and 1220 instead of stage 1120. Stage 1210 is preceded by stage 1110. Stage 1220 is followed by stages 1130 and 1140.

Stage 1210 includes receiving data to be encoded to provide a group of codewords.

Stage 1210 is followed by stage 1220 of generating the group of codewords by encoding the data while at least partially compensating for an expected outcome of violating the at least one ordering rule during interleaving of at least two portions of a first codeword.

According to various embodiments of the invention the compensation can be applied when reading the programmed codewords from the flash memory device. The data can be read multiple times, it can be soft decoded, and the like. This is illustrated in FIG. 13.

FIG. 13 illustrates method 1300 for interleaving and reading codewords according to various embodiments of the invention. Method 1300 differs from method 1100 by including stage 1310 of reading the group of codewords (or a part of the group) while at least partially compensating for excessive errors that may result from the violation of one or more rules (during stage 1130).

Figure 14:
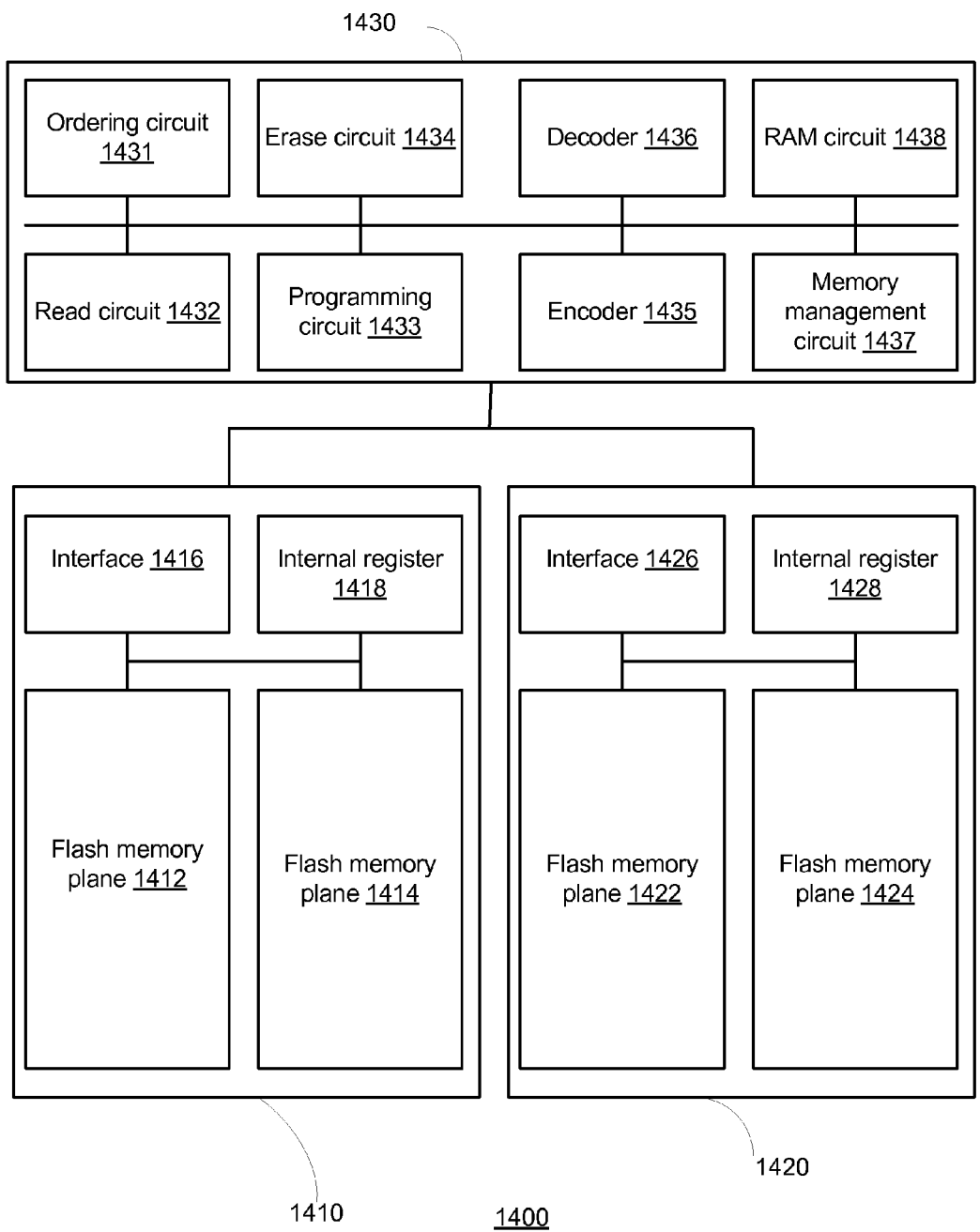
FIGS. 14-15 illustrate systems according to various embodiments of the invention.

FIG. 14 illustrates system 1400 according to an embodiment of the invention.

System 1400 is illustrated as including two flash memory dies 1410 and 1420, each including two planes—(1412, 1414) and (1422, 1424), an interface (1416 and 1426 respectively) and an internal register (1418 and 1428). Each flash memory die (or even each plane) can have an internal controller (not shown) for managing read and write within the flash memory die.

System 1400 may execute any of the mentioned above methods, may apply any of the mentioned above programming sequences as well as other programming sequences such as those that differ from those illustrated above by the size of the decoupling sequence step.

The internal register (1418 and 1428) of each flash memory die is used as an intermediate stage for transferring codeword portions.

Each plane 1412, 1414, 1422 and 1424 has multiple rows. For simplicity of explanation rows of the different flash memory planes that share the same row number are regarded as the same row of the flash memory block.

The flash memory dies 1410 and 1420 are connected to a memory controller 1430. The memory controller 1430 may include an ordering circuit 1431, a read circuit 1432, a programming circuit 1433, an erase circuit 1434, an encoder 1435, a decoder 1436, a memory management circuit 1437 and a random access memory (RAM) circuit 1438. It is noted that the memory controller 1430 may include less circuits, more circuits or other circuits.

The memory management circuit 1437 can perform flash memory management operations such as wear leveling.

The encoder 1435 can encode data to provide codewords. The decoder 1436 can decode codewords. These circuits (1435 and 1436) can treat codeword portions that are interleaved while violating one or more ordering rules in a different manner than other codeword portions. They can apply to the former codeword portions error correcting codes that have better error correction capabilities. The latter codewords can include more redundancy bits and the like. This can at least partially compensate for the expected higher error rates that may result from the violation of the at least one ordering rule.

The ordering circuit 1431 can be used for receiving or determining an order of programming of codeword portions. It may also be used to maintain the order of reading the codeword portions from the flash memory planes.

The ordering circuit 1431 outputs order information to the programming circuit 1433 that represents an interleaving of at least two portions of a first codeword of the group between at least two flash memory planes while violating at least one ordering rule out of (a) an even odd ordering rule, (b) a programming type ordering rule, and (c) a codeword portions ordering rule; and interleaving different portions of other codewords of the group between the multiple flash memory planes while maintaining the even odd ordering rule, the programming type ordering rule and the codeword portions ordering rule;

The read circuit 1432 can read codeword portions from the flash memory planes based on read instructions and order information received from the ordering circuit 1431 and can decode the codewords. The decoding can include compensating for excessive errors expected from at least two codeword portions of a first codeword that were programmed while violating at least one ordering rule out of (a) an even odd ordering rule, (b) a programming type ordering rule, and (c) a codeword portions ordering rule.

The programming circuit 1433 can program the codeword portions such as to:

i. Interleave at least two codeword portions of a first codeword between at least two different flash memory planes while violating at least one ordering rule out of (a) an even odd ordering rule, (b) a programming type ordering rule, and (c) a codeword portions ordering rule.

ii. Interleave different portions of other codewords of the group between the multiple flash memory planes while maintaining the even odd ordering rule, the programming type ordering rule and the codeword portions ordering rule.

The programming circuit 1433 may be arranged to violate the at least one ordering rule for each type of codeword of the different types of codewords.

The programming circuit may perform said violation of at least one ordering rule while programming the at least two portions to rows having a same row number or to two portions of rows having different row numbers.

The group of codewords can be programmed to a flash memory block that spans over multiple planes. The programming circuit 1433 may be arranged to program the at least two portions to a row at a start of a flash memory block and to another row at an end of another flash memory block.

It is noted that programming circuit 1433 can perform the interleaving between multiple flash memory planes that belong to a same flash memory die, to a pair of flash memory dies or to more than two flash memory dies (for example—four).

According to various embodiments of the invention the ordering circuit 1431 can generate or receive order information that will cause the programming circuit to violate only one ordering rule out of the even odd ordering rule, the programming type ordering rule and the codeword portions ordering rule.

According to an embodiment of the invention the ordering circuit 1431 can generate order information that will apply different odd and even ordering rules for different types of programming. Any of the mentioned above methods can apply the same. For example, the interleaving can be done between MSB and LSB programming and not between odd and even pages.

According to an embodiment of the invention the ordering circuit 1431 is arranged to generate the order information based on the even odd ordering rule, the programming type ordering rule and the codeword portions ordering rule. Thus, only these rules can determine the order of programming. Alternatively, one or more additional rules or mapping can be applied in order to determine the order information. For example, these rules can determine a logical program order that may be altered (by applying a logical to physical mapping) to determine order information that represents the physical program order. It is noted that other transformations (not limited to logical to physical mappings) can be applied when generating (by the ordering circuit 1431 or by another entity) the order information.

For example, the ordering circuit can be arranged to determine a logical program order based upon the even odd ordering rule and the program type ordering rule; and apply a logical to physical mapping on the logical program order to provide a physical program order that is upheld during the interleaving of the different portions of the other codewords of the group.

Figure 15:
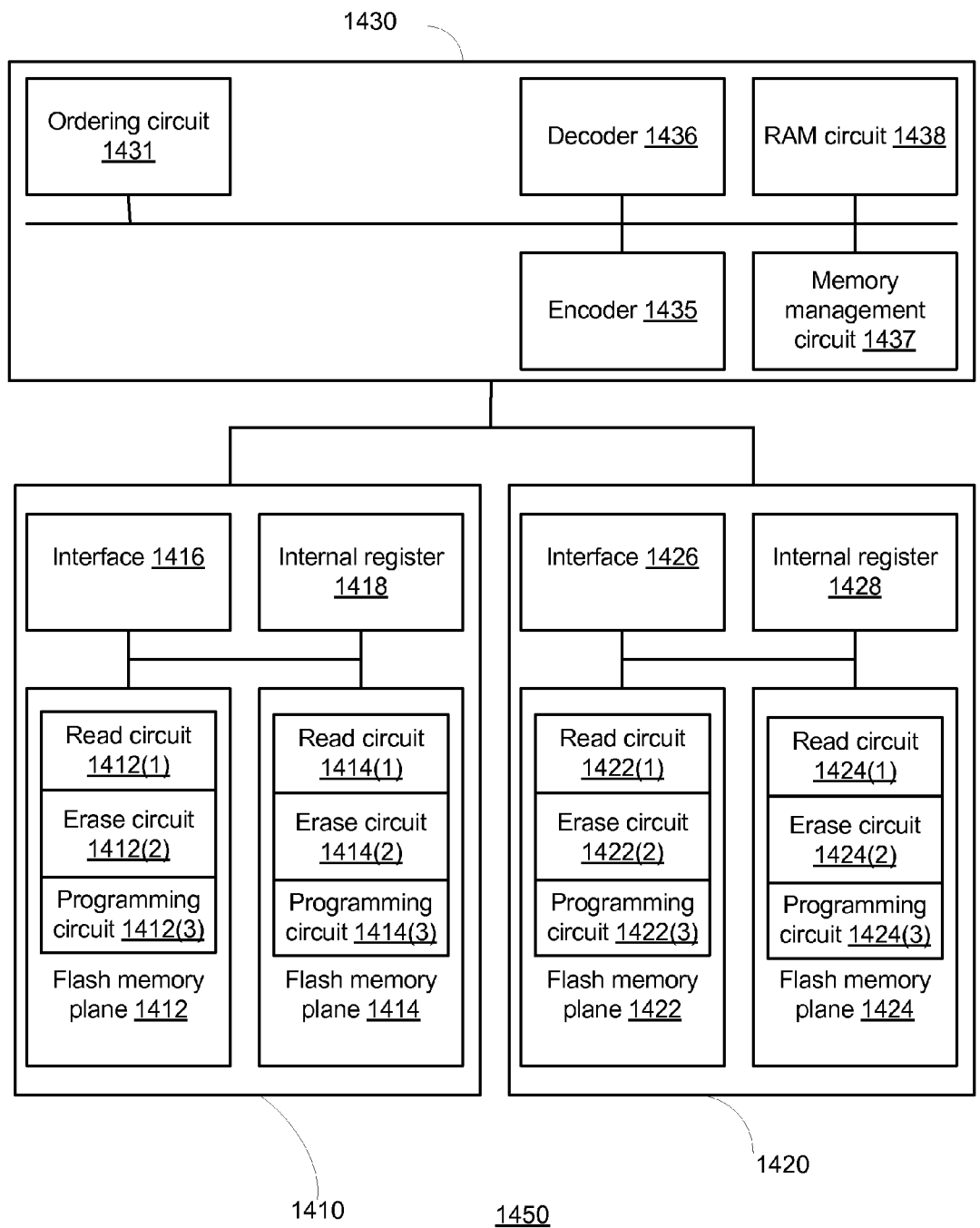

Yet according to another embodiment of the invention each plane has its own erase circuit, program circuit and read circuit. This is illustrated in FIG. 15. Memory planes 1412, 1414, 1422 and 1424 have read circuits 1412(1), 1414(1), 1422(1) and 1424(1) respectively, have erase circuits 1412(2), 1414(2), 1422(2) and 1424(2) respectively and have programming circuits 1412(3), 1414(3), 1422(3) and 1424(3).

FIG. 16 illustrates method 800 for programming multiple codewords in accordance with an embodiment of the invention.

Method 800 may start by stage 810 that may include receiving multiple codewords. Each codeword may include multiple codeword portions.

In accordance with an embodiment of the invention, stage 810 can include receiving multiple information entities and/or units to be decoded and encoding them to provide the multiple codewords. The multiple codewords and/or, the information units can be stored in a buffer before the multiple codewords are written to the flash memory rows. In one embodiment in accordance with the invention, the multiple codewords can be interleaved before step 820. The multiple codewords can be written to the flash memory row portions in an interleaved manner (for example by writing different portions of a codeword to different pages/blocks/dies). Stage 810 may be followed by stage 820 of writing different portions of each codeword to at least two groups of flash memory row portions that may belong to different groups of flash memory rows. A first portion of a certain codeword may be written to a first group of flash memory row portions that may belong to a first group of flash memory rows. A second portion of the certain codeword may be written to a second group of flash memory row portions that may belong to a second group of flash memory rows that may differ from the first group of flash memory rows.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for programming a group of codewords, wherein each codeword comprises multiple codeword portions, the method comprising:
   interleaving at least two portions of a first codeword of a group of codewords between at least two flash memory planes while violating at least one ordering rule out of (a) an even odd ordering rule, (b) a programming type ordering rule, and (c) a codeword portions ordering rule;
   interleaving different portions of other codewords of the group of codewords between multiple flash memory planes while maintaining the even odd ordering rule, the programming type ordering rule and the codeword portions ordering rule;
   wherein the multiple flash memory planes comprise the at least two flash memory planes;
   wherein the codeword portions ordering rule determines an order of programming of different portions of a same codeword;
   wherein the even odd ordering rule determines an order of programming codeword portions to even pages and odd pages of the flash memory planes;
   wherein the programming type ordering rule determines an order of programming types that differ from each other by significance; and
   wherein the programming type ordering rule defines at least two different decoupling sequence steps for at least two different programming types.

2. The method according to claim 1, further comprising violating the at least one ordering rule for each type of codeword of different types of codewords.

3. The method according to claim 1, wherein the interleaving of the at least two portions comprises programming the at least two portions to rows of the at least two flash memory planes, the rows having a same row number.

4. The method according to claim 1, wherein the interleaving of the at least two portions comprises programming the at least two portions to rows of the at least two flash memory planes, the rows, the rows having different row numbers.

5. The method according to claim 1, further comprising programming the group of codewords to rows that form a flash memory block per each flash memory plane; wherein the interleaving of the at least two portions comprises programming the at least two portions to a row at a start of a flash memory block and to another row at an end of another flash memory block.

6. The method according to claim 1, wherein the multiple flash memory planes belong to a same flash memory die.

7. The method according to claim 1, wherein the multiple flash memory planes belong to multiple flash memory dies.

8. The method according to claim 1, wherein the interleaving of the at least two portions comprises violating only the even odd ordering rule.

9. The method according to claim 1, wherein the interleaving of the at least two portions comprises violating only the programming type ordering rule.

10. The method according to claim 1, wherein the interleaving of the at least two portions comprises violating only the codeword portions ordering rule.

11. The method according to claim 1, further comprising interleaving each codeword between at least four flash memory planes.

12. The method according to claim 1 further comprising compensating for an expected outcome of the violating of the at least one ordering rule during the interleaving of the at least two portions of the first codeword.

13. The method according to claim 1, wherein sizes of the different decoupling sequence steps are set according to sensitivity of the at least two different programming types to noise.

14. A method for programming a group of codewords, wherein each codeword comprises multiple codeword portions, the method comprising: interleaving at least two portions of a first codeword of a group of codewords between at least two flash memory planes while violating at least one ordering rule out of (a) an even odd ordering rule, (b) a programming type ordering rule, and (c) a codeword portions ordering rule; interleaving different portions of other codewords of the group of codewords between multiple flash memory planes while maintaining the even odd ordering rule, the programming type ordering rule and the codeword portions ordering rule; determining an order of programming of the different portions of the other codewords of the group of codewords by: determining a logical programming order based upon the even odd ordering rule and the programming type ordering rule; and applying a logical to physical mapping on the logical programming order to provide a physical programming order that is upheld during the interleaving of the different portions of the other codewords of the group of codewords; wherein the multiple flash memory planes comprise the at least two flash memory planes; wherein the codeword portions ordering rule determines an order of programming of different portions of a same codeword; wherein the even odd ordering rule determines an order of programming codeword portions to even pages and odd pages of the flash memory planes; and wherein the programming type ordering rule determines an order of program types that differ from each other by significance.

15. A system, comprising:
at least one flash memory die that comprises multiple flash memory planes; and
a memory controller arranged to:
interleave at least two portions of a first codeword of a group of codewords between at least two flash memory planes while violating at least one ordering rule out of (a) an even odd ordering rule, (b) a programming type ordering rule, and (c) a codeword portions ordering rule; and
interleave different portions of other codewords of the group of codewords between the multiple flash memory planes while maintaining the even odd ordering rule, the programming type ordering rule and the codeword portions ordering rule;
wherein the multiple flash memory planes comprise the at least two flash memory planes;
wherein the codeword portions ordering rule determines an order of programming of different portions of a same codeword;
wherein the even odd ordering rule determines an order of program codeword portions to even pages and odd pages of the flash memory planes;
wherein the programming type ordering rule determines an order of program types that differ from each other by significance; and
wherein the programming type ordering rule defines at least two different decoupling sequence steps for at least two different programming types.

16. The system according to claim 15 wherein the memory controller is arranged to violate the at least one ordering rule for each type of codeword of the different types of codewords.

17. The system according to claim 15 wherein the memory controller is arranged to program the at least two portions to rows having a same row number.

18. The system according to claim 15 wherein the memory controller is arranged to program the at least two portions to rows having different row numbers.

19. The system according to claim 15, wherein the memory controller is arranged to program the group of codewords to rows that define a flash memory block per each flash memory plane; and wherein the memory controller is arranged to program the at least two portions to a row at a start of a flash memory block and to another row at an end of another flash memory block.

20. The system according to claim 15, wherein the multiple flash memory planes belong to a same flash memory die.

21. The system according to claim 15, wherein the multiple flash memory planes belong to multiple flash memory dies.

22. The system according to claim 15 wherein the memory controller is arranged to violate only the even odd ordering rule.

23. The system according to claim 15 wherein the memory controller is arranged to violate only the programming type ordering rule.

24. The system according to claim 15 wherein the memory controller is arranged to violate only the codeword portions ordering rule.

25. The system according to claim 15 wherein the memory controller is arranged to interleave each codeword between at least four flash memory planes.

26. The system according to claim 15, further comprising an encoder that is arranged to at least partially compensate for an expected outcome of violating of the at least one ordering rule during the interleaving of the at least two portions of the first codeword.

27. The system according to claim 15, wherein sizes of the different decoupling sequence steps are set according to sensitivity of the different types of programming to noise.

28. A system, comprising: at least one flash memory die that comprises multiple flash memory planes; and a memory controller arranged to: interleave at least two portions of a first codeword of a group of codewords between at least two flash memory planes while violating at least one ordering rule out of (a) an even odd ordering rule, (b) a programming type ordering rule, and (c) a codeword portions ordering rule; and interleave different portions of other codewords of the group of codewords between the multiple flash memory planes while maintaining the even odd ordering rule, the programming type ordering rule and the codeword portions ordering rule; wherein the multiple flash memory planes comprise the at least two flash memory planes; wherein the codeword portions ordering rule determines an order of programming of different portions of a same codeword; wherein the even odd ordering rule determines an order of program codeword portions to even pages and odd pages of the flash memory planes; wherein the programming type ordering rule determines an order of program types that differ from each other by significance; wherein the memory controller is further arranged to determine a logical program order based upon the even odd ordering rule and the program type ordering rule; and apply a logical to physical mapping on the logical program order to provide a physical programming order that is upheld during the interleaving of the different portions of the other codewords of the group of codewords.

29. A non-transitory computer readable medium, wherein the non-transitory computer readable medium storing instructions for:
interleaving at least two portions of a first codeword of a group of codewords between at least two flash memory planes while violating at least one ordering rule out of (a) an even odd ordering rule, (b) a programming type ordering rule, and (c) a codeword portions ordering rule;
interleaving different portions of other codewords of the group of codewords between multiple flash memory planes while maintaining the even odd ordering rule, the programming type ordering rule and the codeword portions ordering rule;
wherein the multiple flash memory planes comprise the at least two memory flash memory planes;
wherein the codeword portions ordering rule determines an order of programming of different portions of a same codeword;
wherein the even odd ordering rule determines an order of programming codeword portions to even pages and odd pages of the flash memory planes;
wherein the programming type ordering rule determines an order of programming types that differ from each other by significance; and
wherein the programming type ordering rule defines at least two different decoupling sequence steps for at least two different programming types.

30. The non-transitory computer readable medium according to claim 29, wherein the non-transitory computer readable medium storing instructions for violating the at least one ordering rule for each type of codeword of different types of codewords.

31. The non-transitory computer readable medium according to claim 29, wherein the non-transitory computer readable medium storing instructions for programming the at least two portions to rows of the at least two flash memory planes, the rows having a same row number.

32. The non-transitory computer readable medium according to claim 29, wherein the non-transitory computer readable medium storing instructions for programming the at least two portions to rows of the at least two flash memory planes, the rows having different row numbers.

33. The non-transitory computer readable medium according to claim 29, wherein the non-transitory computer readable medium storing instructions for programming the group of codewords to rows of the at least two flash memory planes, the rows form a flash memory block per each flash memory plane; wherein the interleaving of the at least two portions comprises programming the at least two portions to a row at a start of a flash memory block and to another row at an end of another flash memory block.

34. The non-transitory computer readable medium according to claim 29, wherein the multiple flash memory planes belong to a same flash memory die.

35. The non-transitory computer readable medium according to claim 29, wherein the multiple flash memory planes belong to multiple flash memory dies.

36. The non-transitory computer readable medium according to claim 29, wherein the non-transitory computer readable medium storing instructions for violating only the even odd ordering rule.

37. The non-transitory computer readable medium according to claim 29, wherein the non-transitory computer readable medium storing instructions for violating only the programming type ordering rule.

38. The non-transitory computer readable medium according to claim 29, wherein the non-transitory computer readable medium storing instructions for violating only the codeword portions ordering rule.

39. The non-transitory computer readable medium according to claim 29 wherein the non-transitory computer readable medium storing instructions for interleaving each codeword between at least four flash memory planes.

40. The non-transitory computer readable medium according to claim 29, wherein the non-transitory computer readable medium storing instructions for at least partially compensating for an expected outcome of the violating of the at least one ordering rule during the interleaving of the at least two portions of the first codeword.

41. The non-transitory computer readable medium according to claim 29, wherein sizes of the different decoupling sequence steps are set according to sensitivity of the at least two different programming types to noise.

42. A non-transitory computer readable medium, wherein the non-transitory computer readable medium storing instructions for: interleaving at least two portions of a first codeword of a group of codewords between at least two flash memory planes while violating at least one ordering rule out of (a) an even odd ordering rule, (b) a programming type ordering rule, and (c) a codeword portions ordering rule; interleaving different portions of other codewords of the group of codewords between multiple flash memory planes while maintaining the even odd ordering rule, the programming type ordering rule and the codeword portions ordering rule; determining a logical programming order based upon the even odd ordering rule and the programming type ordering rule; and applying a logical to physical mapping on the logical programming order to provide a physical programming order that is upheld during the programming of the interleaving of the different portions of the other codewords of the group of codewords; wherein the multiple flash memory planes comprise the at least two flash memory planes; wherein the codeword portions ordering rule determines an order of programming of different portions of a same codeword; wherein the even odd ordering rule determines an order of programming codeword portions to even pages and odd pages of the flash memory planes; wherein the programming type ordering rule determines an order of programming types that differ from each other by significance.

* * * * *